United States Patent [19]

Sanchez et al.

[11] 4,301,037

[45] Nov. 17, 1981

[54] EXTRUDED ALUMINA CATALYST SUPPORT HAVING CONTROLLED DISTRIBUTION OF PORE SIZES

[75] Inventors: Moisés G. Sanchéz, Severna Park; Jose E. Herrera, Ellicott City, both of Md.

[73] Assignee: W. R. Grace & Co., New York, N.Y.

[21] Appl. No.: 136,222

[22] Filed: Apr. 1, 1980

[51] Int. Cl.³ .................. B01J 21/04; B01J 23/10; C01F 7/02

[52] U.S. Cl. ................... 252/462; 252/463; 423/628; 264/142

[58] Field of Search ............... 252/462, 463; 423/628; 264/142

[56] References Cited

U.S. PATENT DOCUMENTS

| | | | |
|---|---|---|---|
| 3,067,128 | 12/1962 | Kimberlin et al. | 208/138 |
| 3,245,919 | 4/1966 | Gring et al. | 252/465 |
| 3,267,025 | 8/1966 | Gring et al. | 208/136 |
| 3,322,494 | 5/1967 | Magee et al. | 423/628 |
| 3,322,495 | 5/1967 | Magee | 423/628 |
| 3,383,301 | 5/1968 | Beuther et al. | 208/216 PP |
| 3,393,148 | 7/1968 | Bertolacini et al. | 208/264 |
| 3,417,028 | 12/1968 | Montgomery et al. | 252/317 |
| 3,520,654 | 7/1970 | Carr et al. | 423/628 |
| 3,530,066 | 9/1970 | Kuwata et al. | 208/309 |
| 3,630,888 | 12/1971 | Alpert et al. | 208/109 |
| 3,770,617 | 11/1973 | Riley et al. | 208/216 PP |
| 3,814,683 | 6/1974 | Christman et al. | 208/216 PP |
| 3,850,849 | 11/1974 | Kiovsky et al. | 252/463 |
| 3,853,789 | 12/1974 | Warthen et al. | 252/463 |
| 3,864,461 | 2/1975 | Miller et al. | 423/628 |
| 3,876,523 | 4/1975 | Rosinski et al. | 208/89 |
| 3,898,155 | 8/1975 | Wilson | 208/216 |
| 3,898,322 | 8/1975 | Leach | 423/628 |
| 3,901,792 | 8/1975 | Wolk et al. | 208/210 |
| 3,966,588 | 6/1976 | Beaty | 208/216 |
| 3,975,509 | 8/1976 | Royer et al. | 423/626 |
| 3,975,510 | 8/1976 | Leach et al. | 423/628 |
| 3,983,197 | 9/1976 | Mitsche et al. | 264/56 |
| 3,987,155 | 10/1976 | Ziegenhain | 423/628 |
| 3,997,476 | 12/1976 | Cull | 252/463 |
| 4,001,144 | 1/1977 | Pearson et al. | 252/463 |
| 4,019,978 | 4/1977 | Miller et al. | 208/213 |
| 4,024,231 | 5/1977 | Ziegenhain | 423/628 |
| 4,032,433 | 6/1977 | Petri et al. | 208/112 |
| 4,048,060 | 9/1977 | Riley | 208/210 |
| 4,069,139 | 1/1978 | Riley et al. | 208/216 PP |
| 4,089,774 | 5/1978 | Oleck et al. | 208/89 |
| 4,102,821 | 7/1978 | Pessimisis | 252/463 |
| 4,102,822 | 7/1978 | Mulaskey | 252/465 |
| 4,115,248 | 9/1978 | Mulaskey | 208/112 |
| 4,119,531 | 10/1978 | Hopkins et al. | 208/251 H |
| 4,120,826 | 10/1978 | Ebel et al. | 252/465 |
| 4,140,773 | 2/1979 | Stowell et al. | 423/628 |
| 4,154,812 | 5/1979 | Sanchez et al. | 423/626 |
| 4,166,026 | 8/1979 | Fukui et al. | 208/210 |
| 4,172,809 | 10/1979 | Triki | 252/455 R |
| 4,176,171 | 11/1979 | Bendig et al. | 423/628 |
| 4,177,163 | 12/1979 | Oleck et al. | 252/462 X |
| 4,179,411 | 12/1979 | Broersma et al. | 252/465 |
| 4,188,284 | 2/1980 | Quick et al. | 208/216 PP |
| 4,212,729 | 7/1980 | Hensley et al. | 208/210 |
| 4,225,421 | 9/1980 | Hensley et al. | 208/216 PP |
| 4,257,922 | 3/1981 | Kim et al. | 252/465 |

FOREIGN PATENT DOCUMENTS 1543851 4/1979 United Kingdom .

OTHER PUBLICATIONS

Wan et al., "Catalyst Tailoring for Coal Derived Liquids", Preprint of Paper No. 2 presented before 163rd ACS National Meeting, Boston, Massachusetts, Apr. 10-14, 1972.

Kawa et al., "Evaluation of Catalysts for Hydrodesulfurization and Liquefaction of Coal", Preprint of Paper No. 21 presented before the 167th ACS National Meeting, Fuel Chemistry Div., Los Angeles, Calif., Apr., 1974.

Brooks et al., "Catalyst Development for Coal Liquefaction", Electric Power Research Institute Report for Period Mar. 1, 1975-Jan. 31, 1976 on Research Project 408-1, Published Feb. 1976.

Bertolacini et al., "Catalyst Development for Coal Liquefaction", Electric Power Research Institute Report for Period Feb. 1976-Feb. 1977 on Research Project 408-1, Published Nov. 1977.

Bertolacini et al., "Relation of Coal Liquefaction Catalyst to Performance", Preprint for 175th ACS National Meeting, Anaheim, Calif., Mar. 13-17, 1978, Report No. 1 for the Feul Chemistry Division.

Bertolacini et al., "Catalyst Development for Coal Liquefaction", Electric Power Research Institute, Final Report on Research Project 408-1, Jun. 1979.

Kim et al., "Catalyst Development for Coal Liquefaction", Electric Power Research Institute, Final Report on Research Project 408-1, -2, Nov. 1979.

*Primary Examiner*—W. J. Shine
*Attorney, Agent, or Firm*—Edward J. Cabic

[57] ABSTRACT

A thermally stable, pure transition alumina extrudate suitable for use as a catalyst support has a uniquely defined bimodal pore size distribution and very good mechanical properties. Most of the surface area is in a micropore region having pores of less than 500 Angstrom units, a pore volume of 0.60 to 0.80 cm.$^3$/g., a narrowly defined effective pore volume distribution within this region and a median pore diameter which can be controlled within the range of 90–210 Angstrom units. The macropore region made of pores having diameters of 1,000- 10,000 Angstrom units has a pore volume of at least 0.10 cm.$^3$/g. These two pore volumes are essentially connected directly to each other. The extrudates can be strengthened by acidic additives and given increased thermal stability by adding rare earth oxides.

55 Claims, 4 Drawing Figures

GRAPHICAL REPRESENTATION OF PORE SIZE DISTRIBUTION

GRAPHICAL REPRESENTATION OF PORE VOLUME AS A FUNCTION OF PORE DIAMETERS FOR A BIMODAL PORE SIZE DISTRIBUTION ALUMINA

GRAPHICAL REPRESENTATION OF PORE VOLUME DISTRIBUTION AS A FUNCTION OF ACTIVATION TEMPERATURE

GRAPHICAL REPRESENTATION OF PORE SIZE DISTRIBUTION FOR VARIOUS CALCINATION TEMPERATURES

EXTRUDED ALUMINA CATALYST SUPPORT HAVING CONTROLLED DISTRIBUTION OF PORE SIZES

BACKGROUND OF THE INVENTION

1. Field of the Invention

The invention relates to pure transition alumina extrudates having good mechanical properties and a controlled pore size distribution which are suitable as catalyst supports and to methods of producing them. The extrudates have a bimodal pore size distribution with one pore volume of at least 0.10 cm.$^3$/g. made of macro sized pores, a second pore volume of at least 0.60 cm.$^3$/g. made of micro sized pores having a median pore diameter which is controlled in the range of 90–210 Angstrom units, and an intermediate pore volume of less than 0.05 cm.$^3$/g. The extrudates can be further stabilized with a rare earth treatment.

2. Description of the Prior Art

Catalyst supports made of many different forms of alumina are known. However, little work has been reported directed to producing a pure transition alumina catalyst extrudate support wherein the pore size distribution is controlled to produce essentially a bimodal pore structure having three key properties. The first is to have a substantial pore volume made up of micropores in the range of 0–500 Angstrom units, which pores exhibit essentially all of the total surface area and which are narrowly distributed about the median pore diameter. The second is to have a significant volume of large macropores having diameters larger than 1,000 Angstrom units, but which exhibit only a very small fraction of the total surface area. The third is to have these extrudates exhibit excellent mechanical properties such as crush strength and attrition resistance in spite of their open pore structures. Nor has there been much discussion in the literature about this type of an extrudate where the large and small pore structures are interconnected by a very small fraction of pores of intermediate size in the range of 500–1,000 Angstrom units.

U.S. Pat. No. 3,898,322 to Leach discloses a catalyst support having a bimodal pore volume distribution with a large range of pore diameter distributions. The small size pores, which make up 20–40 percent of the total pore volume, consist of pores having a pore diameter from about 40 to 100 Angstrom units. The larger size pores have pore diameters from about 250 to 800 Anstrom units. Thus the overall pore size distribution tends to be toward smaller pores.

U.S. Pat. No. 3,770,617 to Riley et al discloses an alumina support having a specified pore size distribution with three pore size ranges identified. The largest size is made of pores of greater than 2,000 Angstrom units, and this makes up 3.0 to 10.0 percent of the total pore volume. The second size is made of pores ranging from 200–2,000, and this comprises a minor amount of 0.5 to less than 4 percent of the total pore volume. The last size identified consists of pores in the range of 30–80 Angstrom units which provide greater than 50 percent of the surface area. As seen in Examples 2 and 3 of the patent, about one-half of the total pore volume resides in these small pores and thus the Riley et al support can be characterized as having a small diameter micropore region. Furthermore, Riley et al requires the presence of 0.5–6 percent silica as a stabilizer, and thus there is no teaching of pure transition alumina.

U.S. Pat. No. 3,853,789 to Warthen et al relates to a macroporous alumina extrudate having a large surface area with a very substantial macroporosity. The amount of macroporosity is so great that over 40 percent of the pore volume is in pores greater than 3,500 Angstrom units. These extrudates do not have a substantial pore volume made of micropores having pore diameters in the range of 0–500 Angstrom units.

U.S. Pat. No. 3,898,155 to Wilson discloses an alumina catalyst for demetallizing and desulfurizing heavy oils. The catalyst has a Group VI-B metal and at least one Group VIII metal composited with alumina. This composite product has a macropore region made of pores greater than 600 Angstrom units comprising 10 to 40 percent of the total pore volume with the remainder of the pore volume in smaller micropores. The patent does not disclose how to produce the alumina support and so it provides little help to one wishing to produce an extrudate of this type. Neither does it provide any characteristics for the alumina support as a separate unit by itself. In the only two examples where an alumina support is utilized, there is no detailed characterization of the pore size distribution with regard to the nature of the distribution at various pore diameters. In both cases there is a relatively small amount of pore volume in the micropore region below 600 Angstrom units which is on the order of only about 0.527 cm.$^3$/g., clearly below the limit of 0.6 cm.$^3$/g. specified in the present invention.

There is another patent which discloses an extrudate that has a combination of large and small pore size distributions, although there is no focus on any criticality between the two sizes. This is U.S. Pat. No. 3,975,510 to Leach, which relates to a low density, high porosity alumina extrudate produced by treatment of the alumina with an organic solvent prior to the extrusion step. From the detailed pore size distributions of the micropore region below 500 Angstrom units given in Tables II and III of the patent, a relatively broad pore size distribution is seen about the median pore diameter which includes many small size pores. There is no achievement here of a narrow pore size distribution which is distributed about the median micropore diameter. The median micropore diameter itself is small and less than 88 Angstrom units. Furthermore there is no mention of the mechanical properties.

OBJECTS OF THE INVENTION

It is an object of this invention to fabricate the new alumina powder disclosed by Sanchez et al in U.S. Pat. No. 4,154,812, (hereafter identified as Alumina B) which is a microcrystalline pseudoboehmite-boehmite intermediate having from about 70 to about 85 weight percent of the total Al$_2$O$_3$ present in the crystalline form, to make catalyst supports in extrusion form which have good properties for catalytic use including good mechanical and thermal stability properties.

It is a further object of this invention to treat the new alumina powder prior to extrusion and in a post extrusion calcination step to produce a bimodal catalyst support in the form of an extrudate that has a large specific surface area made up from micropores and a large micropore volume resulting from pores having diameters smaller than 500 Angstrom units coupled with a significant macropore volume resulting from pores having diameters in the range of 1,000 to 10,000 Angstrom units. These large pores provide easy access to the small pores where the high surface area resides.

It is a further object of this invention to provide a method to make alumina extrudates exhibiting a bimodal pore size distribution consisting of a large fraction of micropores and macropores; said micro and macroporosity interconnected directly with essentially no intervening intermediate porosity.

It is a further object of this invention to provide a method to make alumina extrudates in which the median pore diameter of the micropores is controlled by appropriate calcination temperatures and the median pore diameter of the macropores is controlled by the mixing conditions prior to extrusion.

It is a further object of this invention to obtain an alumina extrudate in which the effective pore size distribution about the median micropore diameter is maintained within a narrow range.

It is still a further object of this invention to obtain an alumina extrudate having good mechanical properties such as high crush strength and low attrition loss while having a thermal stability which permits the extrudates to be heated from temperatures of about 1,000° to about 1,600° F. without significantly changing the micropore volume.

It is a further object of this invention to fabricate the extrudates with not only dry alumina powder, but also a mixture of the dry powder and washed wet filter cake from which the dry powder is obtained. Recycled fines can also be added to the composition being extruded.

It is a further object of this invention to optionally increase the mechanical properties of the extrudates by adding small amounts of acidic additives which increase the average crush strength.

It is another object of this invention to optionally add rare earth compositions to the extrudates when it is desired to increase the thermal stability of the extrudates.

These and further objects will become apparent as the description of the invention proceeds.

SUMMARY OF THE INVENTION

It has been unexpectedly found that by extruding the new alumina powder described in U.S. Pat. No. 4,154,812 under special conditions it is possible to form catalyst supports in extrusion form which exhibit very unusual properties including a bimodal pore size distribution. The surface area has been found to be essentially controlled by the nature of the starting powder and the calcination conditions to which the extrudates are subjected, such as time and temperature, while the microporosity is essentially insensitive to the calcination conditions within the temperature range of about 800° to about 1,900° F. and more preferably in the range of about 1,000° to about 1,600° F. The macroporosity has been found to be determined by the mixing and extruding conditions with changes in the calcination temperature having little or no effect.

Alumina catalyst supports are produced in which the pore size distribution is controlled to obtain an essentially bimodal pore structure with a substantial pore volume made up of micropores in the range of 0-500 Angstrom units. These micropores provide a very high proportion of the total surface area. There is also a relatively large volume of pores made of pores which are larger than 1,000 Angstrom units. These macropores, however, do not provide essentially any surface area. Instead they serve as access passages to permit large molecules to enter the catalyst particle and reach with ease the small micropores where the catalytic activity resides. The micropores and macropore structures are for all practical purposes directly connected to each other with only a very small fraction of pores of intermediate size in the range of 500–1,000 Angstrom units being present.

The micropore volume results from the alumina starting powder and is apparently uniquely dependent on this preferred starting material. The preferred extrudates of this invention have a microporosity which is essentially insensitive to the mixing and extruding conditions to be encountered in practical manufacturing procedures. This lack of variation in microporosity is also observed when the extrudates are calcined over a range of heating conditions from about 800° F. to about 1,900° F. In the more preferred range of calcination between about 1,000° F. and about 1,600° F., there is a significant thermal stability exhibited since the pore volume in the micropore region remains essentially the same. Typically, the sample calcined at 1,600° F. will differ in micropore volume by no more than 5 percent from the corresponding extrudates calcined at 1,000° F., preferably it will differ by no more than 2 percent. This is the approximate temperature range over which gamma alumina is stable. On the other hand, different thermal treatments result in changes in surface area. The greater the severity of the thermal treatment, the lower the surface area achievable. The vast majority of the surface area resides in the micropores with greater than 90 percent of the surface area coming from pores with diameters of 500 Angstrom units or less. More preferably, it is greater than 95 percent, with many extrudates exhibiting greater than 98 percent of the surface area in these pores. By varying the calcination temperature, the median diameter of the micropore structure can be controlled to range from about 90 Angstrom units to about 210 Angstrom units.

One of the unusual and unexpected properties of the product of our invention is that it exhibits essentially no intermediate porosity. The intermediate pore volume does not exceed 0.05 cm.$^3$/g., and preferably not more than 0.03 cm.$^3$/g. This unique property appears to be related to the nature of the starting alumina powder, and it is significant since it implies direct access from the macro to the micro pores, thus facilitating diffusion to and from the catalytic sites.

A further characteristic of the extrudate product of this invention is that the macropore volume is essentially insensitive to the calcination conditions. This is an advantageous property since these large macropores can provide an unimpeded access to the catalytic sites which reside in the micropores regardless of the specific nature of the micropore structure desired and the calcination temperature used to attain it. In and out diffusion of reactants and products takes place quickly and effectively. This ease of diffusion can be achieved regardless of the particular micropore size distribution and surface area prepared.

Another unique property of the present extrudate is the uniformity of the micropores about the median micropore diameter. The effective micropore range which is limited by the micropore diameter below which 5 percent of the micropore volume exists ($D_5$), and the micropore diameter below which 95 percent of the micropore volume exists ($D_{95}$), constitutes 90 percent of the total micropore volume.

A measure of the uniformity of the micropore size distribution is given by the ratio of the median diameter ($D_{50}$) to the effective pore size range ($D_{95}-D_5$). This ratio is called the uniformity factor, and is represented by the symbol U. Large relative values of U mean excellent uniformity, while small relative values mean poor uniformity. Mathematically the uniformity factor U is given by:

$$U = \frac{D_{50}}{D_{95} - D_5}$$

All of our products exhibit uniformity factors of greater than about 0.55, preferably greater than 0.60. Our most preferred products exhibit "U" values of greater than 0.70.

The extrudates of this invention, while having a substantial pore volume, also are characterized by having very good mechanical properties. For example, the mechanical strength of the extrudate of the instant invention is quite high as evidenced by its crushing strength. The average crush strength of a particular product, of course, depends on the size of the extrudate as well as on its density. In general, the bigger the extrudate the greater the crush strength will be. Also, the crush strength generally parallels the compacted bulk density. This is understandable since the compacted bulk density is inversely related to the total porosity of the extrudates; and, in general, the greater the porosity the weaker the product will be.

The extrudates of our invention exhibit crush strengths which exceed the limit given by the following equation:

$$ACS > kdD^2L$$

in which:
ACS is the average crush strength in pounds force,
d is the compacted bulk density of the extrudates in pounds per cubic foot,
D is the average extrudate diameter in inches,
L is the average extrudate length in inches, and
k is a factor having a value of at least 90 for all of the extrudates of the invention preferably a value of at least 100 and with a value of at least 120 for the most preferred extrudates of the invention.

For examle, for extrudates ⅛ inch (0.125 inch) in diameter and 0.20 inch in length with a compacted bulk density of 38 pounds per cubic foot, in average crush strength will exceed 10.7 pounds, preferably 11.9 pounds and most preferably 14.2 pounds.

In the event that compacted bulk density measurements are not directly available in order to compute the minimum limit of the average crush strength of the extrudates of our invention, the compacted bulk density value may be calculated from total pore volume measurements using equation (1) on page 15. For this specified calculation the compacted bulk density "d" expressed in pounds per cubic foot may be computed from:

$$\frac{1}{d} = 0.025 \left( V + \frac{1}{\rho} \right)$$

in which:
V = total pore volume in cm.³/g. and
ρ = crystal density of the alumina skeleton in g./cm.³

The good mechanical properties are also evident by the low attrition loss observed in our extrudates which is below 7 weight percent, preferably below 5 weight percent.

The mechanical properties can be further increased by the addition of small amounts of acidic additives, and the extrudates can be made more economically by mixing dry alumina powder with the washed wet filter cake from which the dry powder is obtained. In formulating the composition to be extruded, recycled fines from earlier extrudate productions can also be added. The thermal stability of the extrudates can be increased by adding rare earth oxides to the extrudates.

Thus the present invention describes an alumina extrudate which exhibits a large, controllable, and stable macroporosity, which serves as an easy access path to the catalytic sites. These sites exist on the controllable surface area located within micropores of controllable median diameters. Finally, the absence of intermediate porosity provides a structure with direct connection between macroporosity and microporosity, therefore, facilitating direct access or diffusion from one region to the other.

DESCRIPTION OF THE PREFERRED EMBODIMENTS

DEFINITION OF TERMS AND DETERMINATION PROCEDURES

Figures 1, 2:
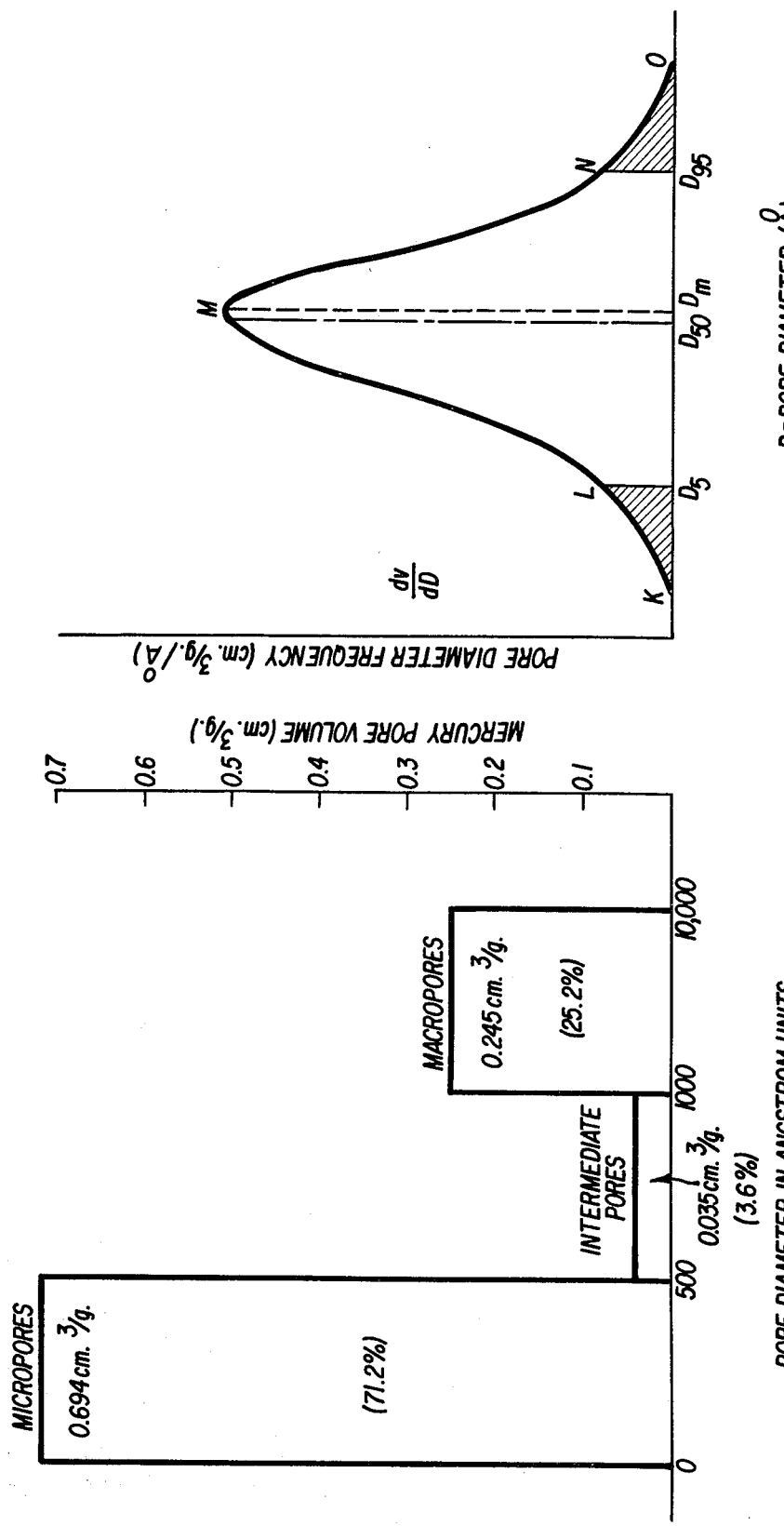
FIG. 1 represents the bimodal distribution of pore volume of the alumina extrudates of this invention.
FIG. 2 represents a plot of pore size distribution.

Many of the technical terms used in this disclosure are capable of multiple interpretation. In order to avoid confusion, the terms as used herein should be interpreted within the definitions provided below or the test procedures used for their determination.
Extrudates
Large particles of alumina with an approximate cylindrical shape obtainable by an extrusion process with a diameter of about 0.5 to about 6 mm.
Porosity
The void or non-alumina portion within activated extrudates. The measurement of porosity can be carried out by activating the sample in order to evacuate any foreign substance present in the internal pores, and filling the voids with substances such as nitrogen, mercury, or water under specified conditions which allow quantitative determinations.
Total Pore Volume
The term "total pore volume" or "specific total pore volume" is a measurement of the total porosity of the extrudates per unit weight of activated alumina. The total pore volume is arbitrarily subdivided into four ranges depending on the diameter of the pores. While in normal terminology we would classify all the pores in these structures as extremely small, we are selecting comparative terms for the four ranges which describe them in relation to each other. The ranges are:
micropore volume, which is the pore volume of all the pores whose diameters are less than 500 Angstrom units.

intermediate pore volume, which is the pore volume of pores whose diameters range from 500 to 1,000 Anstrom units.

macropore volume, which is the pore volume of pores whose diameters range from 1,000 to 10,000 Anstrom units.

super macropore volume, which is the pore volume of pores whose diameters exceed 10,000 Anstrom units (1 micron).

It is essential to have a representative sample of the material when measuring the total pore volume by any of the various methods applicable. In those methods where the size of the sample is large, as for example the determination of the total pore volume by the water pick-up method, extrudates can be used in relatively large quantities. However, in those methods which utilize only a small sample, such as nitrogen or more specifically mercury porosimetry methods, it is important that the small sample be made representative of the extrudates to be characterized. In such cases, the procedure to follow involves selecting a large number of extrudates, fracturing them by any convenient method, such as in motar and pestle, until small but discrete particles of the extrudates are obtained. The resulting fractured product may be sieved through a convenient mesh size, such as for example 20 mesh, and through a fine mesh to separate the medium size fragments from the powder and from the large fragments or extrudates. The intermediate size fragments should then be thoroughly mixed before taking a sample for pore volume characterization.

The total pore volume may be determined by the following method. A given weight of activated extrudates is placed in a small container (for example, a vial). Using a micropipette filled with water, the said sample is titrated with water until all of the pores are filled and the end point of titration occurs at incipient wetness of the external surface. These measurements are consistent with the total pore volume calculated from the equation:

$$V = \frac{f}{d} - \frac{1}{\rho} \quad \text{(Equation 1)}$$

in which:
V = total specific pore volume (cm.$^3$/g.)
f = volume packing fraction (for cylinders of Length to Diameter ratio of about 1.5-2, f is typically 0.64±0.05)
d = compacted bulk density (g./cm.$^3$)
$\rho$ = crystal density of the alumina skeleton (g./cm.$^3$) (for transition aluminas typically between 3.0 and 3.56 g./cm.$^3$).

In certain instances when the extrudates do not possess pores larger than 10,000 Angstrom units in diameter, the total pore volume may be determined by mercury penetration as indicated below.

Compacted Bulk Density

A given weight of activated extrudates is placed in a graduated cylinder of sufficient size to contain the sample within its graduated volume. "Activated" as used herein means treated at an elevated temperature such as up to 1,000° F. in a forced draft oven or under vacuum for a period of time sufficient to remove any volatile substances from the pores. This activation insures that all materials are tested uniformly. The cylinder is then vibrated until all settling ceases and a constant volume is obtained. The weight of sample occupying a unit volume is then calculated. The compacted bulk density may be conveniently expressed in grams per cubic centimeter or in pounds per cubic foot (pcf).

Mercury Pore Size Distribution

The pore size distribution of activated extrudates may be determined in part by mercury porosimetry. The mercury intrusion technique is based on the principle that the smaller a given pore, the greater will be the mercury pressure required to force mercury into that pore. Thus, if an evacuated sample is exposed to mercury and pressure is applied incrementally while determining the mercury volume which penetrates the sample at each increment, the pore size distribution can be established. The relationship between the equilibrium pressure and the smallest pore into which mercury will penetrate at that pressure is given by the equation:

$$r = -\frac{2\sigma \cos\theta}{P} \times 10^8 \quad \text{(Eq 2)}$$

where:
r = the pore radius in Angstrom units
$\sigma$ = surface tension in dynes/cm.
$\theta$ = contact angle in degrees
p = pressure in dynes/cm$^2$.

The equipment used for the determination given in this application was an Aminco 60,000 Porosimeter, Model 4-7125 manufactured by American Instrument Co., Silver Spring, Maryland, whose capability allows the measurement of the pore size distribution between 35 and 10,000 Angstrom units.

Average Micropore Diameter:

The average micropore diameter is a parameter which can be calculated from the micropore volume and the surface area. The calculation is based on a cylindrical model for the shape of the pores. Based on this model, the average micropore diameter is given by:

$$\overline{D} = 40,000 \, v/S \quad \text{(Eq. 3)}$$

in which
$\overline{D}$ = average micropore diameter in Angstrom units
v = micropore volume in cm.$^3$/g.
S = surface area in m.$^2$/g.

Micropore Volume Median Diameter

The micropore volume median diameter, or simply the micro median diameter, is a dividing parameter. The micropore volume is divided into two halves, with one half made up of pores larger than the micro median diameter and the other half made up of smaller pores. The micro median diameter is represented by the symbol $D_{50}$ and is conveniently expressed in Angstrom units.

Macropore Volume Median Diameter:

The macropore volume median diameter or simply the macro median diameter is represented by the symbol M $D_{50}$. It is defined similarly to the micro median diameter as it applies to the macro pore volume.

Nitrogen Pore Size Distribution:

The nitrogen pore size distribution within activated extrudates may be determined by condensation of pure nitrogen into the pores within the structure for different nitrogen pressures at liquid nitrogen temperature. The volume of nitrogen condensed within the pore structure is related to the nitrogen partial pressure to determine the pore size distribution up to 600 Angstrom units in diameter. In a specific limited measurement it is possible to determine the nitrogen pore volume which consists of the summation of the volumes of all the pores whose diameters are equal to or smaller than 600 Angstrom units. The pore volume is usually expressed in cm.$^3$/g. of alumina.

Nitrogen B.E.T. Surface Area:

The nitrogen B.E.T. surface area, or most commonly, the surface area of the sample is determined by a method described in the article by S. Brunauer, P. Emmett, and E. Teller, *J. Am. Chem. Soc.*, Vol. 60, p. 309 (1938). This method depends on the condensation of nitrogen onto the pore surfaces, and it is effective for measuring the surface area of pores with diameters down to the range of about 10 Angstrom units. The amount of nitrogen adsorbed is related to the surface area per unit weight of the support. It is usually expressed in m.$^2$/g. of alumina.

The surface area may also be determined by similar methods which have evolved over the years and which are based on the same principle of nitrogen adsorption used for the B.E.T. surface area. Depending on the specific method of measurement, there might be some variation of the surface area measurements made on a given sample. Variations of up to ±10 percent may be encountered.

Shrinkage

A given amount of particles is placed in a graduated cylinder and vibrated until no further settling occurs, as is done in determining Compacted Bulk Density. This sample is then placed in a muffle furnace at 1,800° F. For 24 hours. At the end of this exposure, its volume is again measured after vibration until no further settling occurs. The loss in volume after heating is calculated, based on the original volume, and reported as percent volume shrinkage.

Average Crush Strength:

Crush strength is determined by placing the cylindrical particle between two parallel plates of a testing machine such as the Pfizer Hardness Tester, Model TM141-33, manufactured by Charles Pfizer and Co., Inc., 630 Flushing Avenue, Brooklyn, N.Y., and with the long axis of the particle parallel to the plates. The plates are slowly brought together by hand pressure. The amount of force required to crush the particle is registered on a dial which has been calibrated in pounds force. A sufficient number (for example, 50) of particles is crushed in order to get a statistically significant measurement for the total population. The average is calculated from the individual results.

Attrition Loss:

A set volume (60 cm.$^3$) of material to be tested is placed in an inverted Erlenmeyer flask of special construction which is connected to a metal orifice inlet. A large (one inch) outlet covered with 14-mesh screening is located on the flat side (bottom) of the flask. High velocity dry nitrogen gas is passed through the inlet orifice causing the particles to: (1) circulate over one another thus causing attrition, and (2) impact themselves in the top section of the flask thus breaking down as a function of strength. The material is tested for five minutes and the remaining particles are weighed. The loss in weight after testing expressed as percent of the initial charge is designated the attrition loss.

The nitrogen flow will be in the range of about 3.5 and 4.0 cubic feet per minute, depending upon the density of the material. The flow rate must be sufficient for the particles to strike the top section of the flask. The fines produced by attrition are carried out of the flask by the nitrogen flow thus causing a loss in weight of the original material charged.

Tritation Number:

An indirect measurement of the surface area of an alumina powder determined by the potentiometric titration of a water slurry of the alumina powder with sulfuric acid as described in U.S. Pat. No. 4,154,812 to Sanchez et al.

Alumina A:

A commercially available microcrystalline alpha alumina monohydrate powder. This is available from American Cyanamid Co. as PA Alumina powder.

Alumina C:

Another commercially available microcrystalline alpha alumina monohydrate powder. This is available from Conoco Chemical Co. as Catapal SB Alumina.

Alumina B:

The alumina powder made in accordance with the teachings of U.S. Pat. No. 4,154,812, to Sanchez et al. This is also another microcrystalline alpha alumina monohydrate.

Alumina Beta:

A purposely degraded alumina B contaminated with large amounts of beta alumina trihydrate.

SELECTION OF THE POWDER FOR EXTRUSION

In making the alumina catalyst support, the preferred material is a microcrystalline pseudoboehmite-boehmite intermediate (hereinafter referred to as Alumina B) as disclosed in the Sanchez et al U.S. Pat. No. 4,154,812, which disclosure is incorporated herein by reference.

As described therein, a partially dried, hydrous alumina produced by the controlled reaction of sodium aluminate and aluminum sulfate is an intermediate between boehmite and pseudoboehmite. This form of alumina is alpha alumina monohydrate with extra water molecules occluded within the crystal structure and has the formula $Al_2O_3 \cdot x\ H_2O$ where x has a value greater than 1 and less than 2. The alumina powder may contain additional non-occluded water above the level indicated by the value of x=2 in the formula $Al_2O \cdot x\ H_2O$. For example, total water contents of 40–50 weight percent are possible which correspond to values of x of about 4 and higher. The boehmite-pseudoboehmite nature of the product, including its crystalline structure, the degree of crystallinity and average size of the individual crystallites, may be determined by x-ray diffraction techniques.

This alumina exhibits an intermediate boehmite-pseudoboehmite structure characterized by a [020] d-spacing which ranges from about 6.2 to about 6.5 Angstrom units, preferably from about 6.3 to about 6.4 Angstrom units. The half maximum intensity width of the [020] peak ranges from about 1.65 to about 1.85 Angstrom units, preferably from about 1.75 to about 1.80 Angstrom units.

In terms of relative crystallinity, the powder exhibits values from about 70 to about 85 weight percent of the total amount of $Al_2O_3$ present in crystalline form. The boehmite-pseudoboehmite product is further characterized by high crystalline purity, by small crystallite size-i.e., microcrystallinity, and by an intermediate relative degree of crystallinity. In these respects, this product is unique by virtue of the fact that it is prepared under conditions which give a controlled ratio of crystalline material to amorphous gel. This is in contrast with other aluminas in which the fraction of amorphous gel in the product is either quite high or essentially non-existent, such as in boehmite. The intermediate nature of the crystallinity gives the powder unique and special properties when used to make extrudates.

One additional way to measure the properties of the powder is to determine the conversion of gel components to undesirable crystalline phases such as bayerite. Amorphous hydrous aluminas have a tendency to crystallize. The particular crystalline phase which is obtained depends on the nature of the environment around the alumina during crystallization. A material consisting of boehmite or pseudoboehmite and containing high proportions of gel components will crystallize to alumina beta trihydrate (bayerite) if exposed to elevated temperatures for long periods of time in an alkaline aqueous environment. In contrast, materials containing little or no gel components will not develop the bayerite crystalline phase under similar conditions of alkaline aging. Thus an alumina prepared at low temperatures and consisting principally of pseudoboehmite interdispersed with a high proportion of gel will, upon aging at least for about 18 hours at about 120° F. in a sodium hydroxide aqueous solution of a high pH such as 10, develop bayerite while otherwise remaining essentially unchanged in its crystalline nature. This indicates that the formation of the bayerite is not at the expense or disappearance of pseudoboehmite but that it is formed from the amorphous alumina gel. In contrast, the powder obtained from the Sanchez et al patent when treated under the same conditions or more stringent conditions such as hot aging for 21 hours at 194° F. (90° C.) will not exhibit any bayerite. This indicates that the amount of gel in the powder is quite small or otherwise more stable.

Still another way to characterize the powder is to measure the anion surface chemisorption at different pH. The anion chemisorption test involves the preparation of a slurry of the alumina powder to be studied with deionized water, and the potentiometric titration of this slurry with dilute sulfuric acid of known normality over a pH range in which alumina is insoluble. The titration is carried out slowly to make sure that there is ample time for the acid to diffuse into the structure of the alumina product. Over the pH ranges in question from about 9 to about 4 alumina is insoluble, so the titration with sulfuric acid is regarded as a measure of the amount of sulfate which becomes fixed or chemisorbed on the surface of the alumina at a given pH. For different aluminas the amount of acid required to reach a particular pH from a common starting point is an indirect measure of the extent of the alumina interface surface area exposed to the aqueous medium. Materials which exhibit a very high degree of crystallinity and very large crystallite size possess a small interface surface area and, consequently, require small amounts of acid to effect a given change in pH. In contrast, materials which are very high in gel content exhibit high interface surface areas and, consequently, require large amounts of acid to effect the same pH change. Products of intermediate crystalline/gel nature will require intermediate amounts of acid to effect the same pH change.

For example, 100 percent crystalline alpha alumina monohydrate which consists of very well-defined large crystallites requires only about 53 milliequivalents of sulfuric acid per mole of alumina to change the pH from an initial value of about 8.3 to a final value of about 4.0. In contrast, an alumina prepared at low temperatures in which the pseudoboehmite nature, percent crystallinity and crystallite size indicate a low degree of crystallinity and a high gel content, requires about 219 milliequivalents of sulfuric acid per mole of alumina to effect the same change in pH.

The composition of the Sanchez et al patent is characterized by intermediate requirements of sulfuric acid to effect the pH change. From about 130 to about 180 milliequivalents of sulfuric acid per mole of alumina, preferably from about 140 to about 160 milleequivalents, will change the pH of a slurry of the powder from about 8.3 to about 4.0.

This starting powder which contains only a relatively small amount of amorphous gel is also thermally stable and does not exhibit any transition to alpha alumina at moderately high temperatures such as 1,800°–1,900° F. Instead the calcined powder has an x-diffraction pattern of theta alumina, gamma alumina, and delta alumina after heating at about 1,850° F. for about one hour. Furthermore, the powder will retain at those temperatures very substantial surface areas and pore volumes which will remain stable even for prolonged periods of time under severe thermal treatments.

After a thermal treatment of about one hour at about 1,850° F., the powder will exhibit a BET nitrogen surface area of about 100 to about 150 square meters per gram, more commonly of about 110 to about 140 square meters per gram. It will also exhibit a nitrogen pore volume from about 0.60 to about 0.80 cm.$^3$/g, most commonly from about 0.64 to about 0.72 cm.$^3$/g.

The powders made from the Sanchez et al patent have the following typical properties.

| | Average of Typical Product | Range of Typical Powders |
|---|---|---|
| Spray Dried Powder | | |
| Wt. % Na$_2$O | 0.03 | 0.01–0.15 |
| Wt. % SO$_4$= | 0.19 | 0.05–0.60 |
| Wt. % Fe$_2$O$_3$ | 0.03 | 0.02–0.066 |
| Wt. % SiO$_2$ | 0.017 | 0–0.14 |
| Wt. % T.V. | 27.9 | 22–40 |
| Bulk Density (lbs/ft$^3$) | 24.0 | 20–34 |
| N$_2$ BET Surface Area* (m.$^2$/g.) | 420 | 300–500 |
| N$_2$ Pore Volume* (cm.$^3$/g.) | 0.82 | 0.65 0.95 |
| Crystalline Phases determined by x-ray diffraction | (boehmite-pseudoboehmite intermediate) - no alpha or beta alumina trihydrate phases present | |
| [020] d-spacing (Å) | 6.37 | 6.2–6.5 |
| Half Intensity Width (Å) | 1.77 | 1.65–1.85 |
| Titration Number | 168 | 130–180 |
| Powder Calcined at 1,850° F. for 1 Hour | | |
| N$_2$ BET Surface Area* (m.$^2$/g.) | 131 | 100–150 |
| N$_2$ Pore Volume* (cm.$^3$/g.) | 0.73 | ca. 0.60–0.75 |
| Crystalline phases determined by x-ray diffraction | Predominantly theta alumina with some gamma alumina and/or delta alumina. No alpha alumina present. | |

*Determined after activation at 750° F. for 30 minutes.

EXTRUSION PROCEDURE

In the practice of the present extrusion invention, the powder used is first mixed with water for the required period of time to obtain the proper extrusion paste and resulting product forming properties. For example, when making relatively small batches of the extrudates a mulling device such as a Simpson Mix Muller manufactured by the National Engineering Co. of Chicago, Illinois, can be used to mix the water and the dry alumina powder. Other mixing equipment that can intimately blend these two components can also be employed. For example, when larger amounts are desired, a Sigma Mixer such as the one made by Baker Perkins Inc. of Saginaw, Mich., can be advantageously used.

The pH of the water may be adjusted to an alkaline range such as 8-11 with a suitable base such as, for example, ammonium hydroxide. The amount of water chosen is based on the amount needed to form an extruding paste having the desired rheology. It will vary with the nature of the alumina and the specific conditions used during mixing such as the mixing time, the mixing temperature, additive used, etc. In the performance of this invention the alumina concentration in the mixture for extrusion can range from about 32-42 weight percent with a more preferable range of from about 35-40 weight percent. When the water level is too high, a fluid-like product is obtained which does not extrude to form solid particles. On the other hand, when the water content is too low, the material is so dry that it is difficult to extrude, and it does not form coherent particles.

In a preferred embodiment a fraction of the alumina powder to be used is placed in the mixer, for example, about one-half of the alumina to be used is charged and then the full amount of water required is added. This first formulation is mixed for a few minutes in this initial dispersion step to obtain a very homogeneous fluid product. The first mixing period using but a fraction of the total alumina is called the dispersion time and is represented by the symbol $t_1$. Then the remaining alumina is added and the entire mixture is subjected to mixing for various time periods. The additional mixing period at full alumina concentration is simply called mixing time. It is represented by the symbol $t_2$. When all the alumina is used in one step the mixing time is simply represented by the symbol $t$.

During this mixing period, the energy added to the system modifies the nature of the alumina particles and renders them extrudable and capable of bonding to themselves when subsequently formed into extrudates. The extent of the mixing time will depend on many factors such as the nature of the alumina powder employed, the batch size, the solids concentration, the powder and geometry of the mixer, the temperature, the presence of additives, the pH of the paste, etc. Mixing periods on the order of 15 to 300 minutes are useful; although periods of 20 to 90 minutes are most commonly used.

In a large scale operation, such as a manufacturing plant, the preferred method for the mixing step is carried out in a manner which allows the operator to make minor adjustments in order to compensate for variability in the starting alumina powder, and yet achieve reproducibly the desired end results.

In a very specific preferred embodiment, the mixing step may be carried out as follows:

1. Determine through preliminary work the approximate optimum range of concentration of alumina in the paste to be extruded, as well as the mixing time required to achieve the desired results in a given mixer for a given batch size.
2. Determine the moisture level of the alumina powder.
3. Calculate the nominal weights of powder B and water to be used in a batch.
4. Add to the mixer between 90 to 95 percent of the alumina powder and all of the water required.
5. Interdisperse the ingredients for a period of time ($t_1$) which will range from 5 to about 15 minutes, preferably from 5 to 10 minutes. At this point, the mix will be relatively fluid and the powder required to drive the mixer relatively low.
6. Begin gradual addition of alumina powder B by small increments and observe the power demand of the mixer as it rises. Control the addition of powder to arrive at a preset power target. Discontinue addition.
7. Continue mixing at this concentration for the present desired total mixing time ($t_1 + t_2$) which will range between about 20 and about 150 minutes, preferably between about 25 and about 50 minutes.
8. Stop mixing and transfer paste to extruder and other equipment to complete manufacture.
9. Evaluate results and use experience to refine your specific intermediate targets for future runs.

After the pre-determined mixing time has taken place, the mixture is fed into an extruder. An example of such an extruding machine is the Auxiliary Worm Extruder manufactured by Welding Engineers Inc. of Norristown, Pennsylvania. This device has a worm screw which pushes the mixture through die holes having the desired diameter. Due to shrinkage of the extrudates upon subsequent drying and calcining, it is necessary to select a larger die hole opening than the size of the final extrudate desired. For example, for a ⅛ inch diameter extrudate (i.e., 0.125 inch or 125 mils) the diameter of the die may range from about 135 to about 160 mils. Similarly, for an extrudate of about 1/16 inch diameter the die size may range from about 65 to about 80 mils.

These extruding devices usually have a gauge or meter which monitors the input power being exerted by the motor into the extruding paste. In typical operations, the device may be run at a constant power input with variable throughput or with a constant throughput with a variable power requirement. Variations in procedures are common and it is obvious that other types of monitoring systems could be used which are known in this machine art.

When it is desired to manufacture extrusion products of a uniform length, a cutting device chosen from several different designs can be positioned outside the die to cut the extruding material. Generally the length selected is related to the diameter of the extrudate so as to obtain a controlled length to diameter ratio (L/D). The L/D ratio can vary from 1 to about 1 to about 8 to 1, with a preferred value being from about 3 to 2 to about 5 to 1.

Various types of cutters adjacent the outside of the die can be employed. One example is a set of rotating blades which are synchronized with the rotation of the worm screw. Further adjustment is possible by increasing or decreasing the number of blades, changing their rate of rotation, changing the rate of push by adjusting the speed of the worm screw, etc. Another type of extrudate cutter is a high speed rotating rod which rotates about its axis which is perpendicular to the direction in which the extrudate is flowing. The outer surface of the rod is positioned at the desired distance from the outside of the die. After the material extrudes out from the die to the desired length, it contacts the high speed rotating rod which immediately flicks off the extruding particle having the desired length. A series of parallel rotating rods can be placed in front of a similar parallel array of die holes to ensure the proper length for all of the extrusion product.

For large scale industrial production, once the system is started, it can run continuously 24 hours a day to make the product. On a more limited laboratory-type batch scale, as the mulled mixture is initially fed into the extruder, the value of power applied by the motor is monitored and allowed to become stable. Any initial material extruded during this stabilization period is set aside for recycling or it is discarded. When the stabilized condition has been achieved, the desired product is then collected. This operation is continued until the material is exhausted or the run is finished.

The next step is an optional step which can be employed when it is desired to round the ends of the extrudates. In the process of chopping or flinging off the continuosly extruding material to the desired length, sharp end edges can be produced. To reduce these sharp edges and any edge irregularities that may be present, the extruded particles may be given a tumbling treatment. For example, they can be placed in a container such as a bucket or barrel which may optionally have vanes or fins on the internal walls and then rotated. This optional treatment which can be for relatively short periods of time, such as for example less than five minutes, will cause the ends to become rounded and this in turn makes the extrudates less susceptible to attrition.

The next step is to dry the extrudates to remove the substantial amounts of water present. The key feature here is the rate of heat application and water removal. Use of a very dry atmosphere at high temperature will cause non-uniform drying. In such cases the dried surface material can flake off. In addition, marked differences in drying between contiguous regions or areas in an extrudate may result in differential shrinking with strains and cracking resulting. In order to avoid these adverse effects, the drying should be done uniformly, and preferably slowly. Thus the particles should be initially dried at relatively low temperatures, such as for example in the range of 130°–170° F. (54° C. to 77° C.) in a controlled humidity environment, and then the temperature can be increased progressively to higher values. For a large scale industrial operation, the extrudates can be placed on a moving perforated conveyor which allows hot gases to flow through the packed bed of extrudates. In this fashion the product passes through adjacent heating zones in which each one is hotter than the one before. Thus in a period of 1-5 hours, preferably 1½ to 3 hours, the particles can be satisfactorily dried. Typically the product will exit at a temperature of 200°–300° F. (93° C. to 149° C.), preferably 220°–280° F. (104° C. to 138° C.).

The next step is to calcine the previously dried particles to obtain an extrudate which is then capable of being converted into catalysts by incorporation of the desired active ingredients such as, for example, platinum, palladium, rhodium or any other noble metals, or oxides of base metals, such as, for example, copper, chromium, cobalt, nickel, molybdenum, etc. This calcination treatment provides the desired micropore size distribution which will in turn insure the proper amount of surface area. Calcination temperatures can vary from about 800° F. to about 2,000° F. (about 427° C. to about 1,093° C.) depending on which micropore diameter range is desired. This heating can be done in a rotary calciner. The calcination can be done in stages with intermediate treatments given the particles between stages.

MODIFICATION OF THE BASIC PROCEDURE

In certain cases, the basic procedure described may be varied to achieve specific effects. For example, during the mixing step one may incorporate acidic additives to the mixture. This step is carried out at times to supplement the mechanical energy input during mixing, and the surface energy of the alumina particles with chemical energy incorporated through these additives. Improvements in mechanical properties are often obtained. In general, the best additives are those acidic compounds which will during the calcination step in air decompose into volatile products. This guarantees that the resulting extrudates will exhibit good purity. A variation consists of using aluminum salts of the decomposable acids. Upon calcination these salts decompose into volatile products and alumina, therefore not affecting purity. Typical such additives are organic acids such as, for example, formic acid, acetic acid, propionic acid, and the like, and inorganic acids such as hydrochloric acid, perchloric acid, nitric acid, and sulfuric acid, as well as the aluminum salts of these acids. Among these acidic additives, nitric acid, formic acid, acetic acid, aluminum nitrate, and mixtures of these, are preferred.

The addition of acidic compounds is usually made during the early periods of the mixing step and can range upwards to about 10 percent of the alumina, but in general, they will be limited to 5 percent or less. In general, the presence of these additives increases the viscosity of the mixture and increases the energy required during mixing at a given concentration.

One final variation in conjunction with the use of acidic additives is their optional neutralization at any time during the mixing step with a base such as, for example, aqueous ammonium hydroxide or anhydrous ammonia gas. Preferably such neutralization will be made towards the end of the mixing step just prior to extrusion. In specific cases neutralization may change the rheology of the system to facilitate extrusion. In summary, acidic additives may be used during the mixing step to assist in mixing, and they can be neutralized so as to not intefere with the following extrusion step. The resulting ammonium salts are obviously decomposable thermally.

The alumina can also be thermally stabilized against phase transformations by impregnation with rare earths. In general, an alumina which contains uniformly dispersed rare earths within its structure will undergo the typical phase transformations which pure alumina undergoes. However, the transitions will occur at several hundred degrees Fahrenheit higher than pure alumina. This is important when the extrudate is to be used as a catalyst support at high temperatures. The delay in the formation of a particular alumina phase depends on the concentration of the rare earth as well as on the specific rare earth used.

The term rare earth as used herein includes any of the elements of the Periodic Table with atomic numbers from 57 to 71, as well as the element, yttrium. Among the more preferred rare earths that can be used to prepare the thermally stabilized extrudates are, for example, lanthanum, cerium, neodymium, samarium, praseodymium, and the like, as well as commercially available mixtures of rare earths. The presence of lanthana is especially preferred with the rare earth oxide comprising 1-15 weight percent of the total extrudate weight and more preferably 3-9 weight percent.

To provide a stabilization, the extrudate is initially calcined at a low temperature such as 600°-1,000° F. for a sufficient period of time to effect the transition of alpha alumina monohydrate to gamma alumina. The lower the temperature at which the transition is completed, the greater the surface area the resulting gamma alumina will have, and the better the material will be for impregnation with rare earth compounds. Typically, 800° F. for one or two hours will suffice to achieve a product consisting entirely of gamma alumina and exhibiting a surface area of 300-500 m.$^2$/g.

The impregnating solution can be any soluble rare earth salt; however, for processing simplicity, the preferred salts are those which are readily thermally decomposable. Examples of these salts are the nitrates, nitrites, acetates, formates and the like. Salts such as the sulfates are less desirable because the thermal decomposition is not effected as readily as for the other soluble salts. Whatever the salt, a solution will be made of high rare earth concentration. This nearly saturated solution can be diluted to any desirable level taking into account the pore volume of the product to be impregnated and the levels of rare earth desired to incorporate into the alumina.

Impregnation should be carried out to incipient wetness or slightly above it. Once the product has been impregnated, it can be dried and subsequently calcined or dried and calcined in one single step.

During the drying phase, the water will be removed and during the calcination step the rare earth salts will decompose to their rare earth oxide. At the highest temperatures of the calcination step, the rare earth oxides will interact with the alumina forming intermediates or solid solutions which will inhibit the phase transformation.

By exercising care to avoid structural changes in the starting alumina, the resulting products will exhibit the same structural features, such as pore size distribution, as the plain alumina from which it is derived. The major differences besides a different chemical composition is the delay in phase transformations which, therefore, provides for better thermal stability. For example, the onset of theta alumina may not occur until 1,900°-2,000° F., and the onset of alpha alumina may not take place until 2,200°-2,300° F. Of course, these ranges are illustrative of the general trends and should not be taken quantitatively since the specific numbers can depend on the concentration factors as well as the distribution of the rare earth in the impregnation solution.

In addition to using dry alumina powder to make the extrudates, it is also possible to use in combination with the dry powder some of the wet filter cake from which the dry powder was obtained. By using mixtures of filter cake and powder, there can be appreciable economic savings made in the manufacturing process since a significant amount of the starting alumina for extrudate formation would not have to be processed through a preliminary drying step. In this particular modification of the basic procedure, all of the water needed to form an extruding paste may come from the filter cake. In a preferred embodiment of this variation, the filter cake is charged to the mixing equipment and mixed for a short period of time, after which the powder is gradually added by increments until the desired concentration as determined by the power input to the mixing motor is obtained.

Still another modification of the basic mixing procedure involves the use of recycle fines in the preparation of the extruding paste. In any manufacturing process, these are small fractions of product which are generated which do not meet the desired target. In the case of extrudates, for example, the extruding operation sometimes results in fragments of small particles or granular material. On occasion, a batch may be prepared with a level of water other than the desired target. Other such "off specs" materials can occur from time to time in the course of a manufacturing campaign. These materials can be discarded which, of course, causes a loss in yields and a decrease in revenues. We have discovered that such "reject" material can be recycled into the process. The procedure involves taking these materials, calcining them at relatively low temperatures, such as 800°-1,200° F., and grinding them to a very fine powder. The temperature at which they are calcined must be no higher than the calcination temperature to be employed in making the final extrudates. These ground recycle fines can be incorporated with the alumina powder into the extrusion mix.

Since these recycle fines originate from the same basic alumina powder, and upon calcination at low temperature they develop an internal pore structure equal to the structure of the products of the instant invention, their incorporation into the mix does not alter the nature of the structure of the composite extrudates. Of course, if the use of recycle fines is carried out in large proportions, the resulting product may suffer. However, the level of recycle fines which are generated in a practical manufacturing facility does not amount to more than about 15 weight percent of production; most commonly, less than 10 percent.

In practicing the process of our invention, levels of recycle fines of up to 15 weight percent are possible without substantially affecting the structural properties of the resulting extrudate. Most commonly, the process can be practiced with levels of recycle fines ranging from about 2 to about 10 weight percent, in which cases the changes in the product are insignificant. Substantial savings can be effected at the indicated levels of recycling alumina fines.

EFFECTS OF MIXING AND EXTRUSION PROCEDURES ON PRODUCT PROPERTIES

As will be seen later, through the specific examples, the single most important variable in the preparation of the extrudate of the instant invention is the starting alumina powder. Alumina B, by virtue of its intermediate boehmite-pseudoboehmite nature, is uniquely suited to make extrudates exhibiting a bimodal pore size distribution while achieving desirable mechanical properties. The crystalline fraction of the powder provides the basic building blocks on which the structure is based, while the amorphous gel component provides the reactive material which binds the crystallites in the final product to achieve good mechanical properties.

The amount of water used to prepare the extruding paste determines the volume fraction occupied by water and the volume fraction occupied by alumina in the initial wet extrudate. In general practice the greater the amount of water used, the greater the average distance between alumina particles in the resulting paste. This, in turn, will result in a large pore volume or a high degree of shrinkage upon drying or calcination. The use of excessive proportions of water results in fluid, "soupy" mixtures which cannot be extruded. On the other hand, the use of minimal quantities of water results in such thick pastes that the product may plug the extruding die.

During the mixing phase, the dispersion time ($t_1$) is important; however, once the alumina has been properly dispersed, there is no need for additional time. Typically, the dispersion time will range from 2 to 15 minutes, most commonly from 8 to 12 minutes depending on the size of the batch and equipment used.

During the mixing time proper ($t_2$), the paste should be mixed for sufficient time to achieve a homogenous dispersion of the alumina in the water. However, there are other phenomena going on during this critical step besides achieving a homogenous paste. During this step, because of the high viscosity of the paste, mixing requires a high input of energy. This energy is used in the system to achieve a number of desirable effects. For example, particles which are aggregates of crystallites will be broken by shear action into small fragments. The temperature or the system may increase. During this mixing step, one of the most important phenomena is the relative alignment and packing of the crystallites or broken aggregates. The energy input results in compaction of the particles with a concomitant change in the energy required to maintain the same degrees of mixing. For example, in a Sigma mixer with a power meter, the energy required to maintain the same rotational speed of the blades will increase during the first phase of the mixing step. However, after the particles have been "worked" and modified, the energy requirement will decrease. The paste becomes more plastic and easier to extrude.

The rheology characteristics of the paste are often easier to achieve when the pH of the extruding paste is on the alkaline side, hence, the use of a base such as ammonia to achieve this effect. In cases involving additives such as, for example, nitric acid, acetic acid and the like and/or acidic salts such as aluminum nitrate, the control of pH is not always desirable or practical.

Whatever the explanation for these very complex and multiple rheological effects, we have observed that in general, the following trends are followed for extrusions made from Alumina B:

There is an optimum range for the alumina concentration which can be extruded under practical conditions. This range can vary from about 32 to about 42 weight percent alumina, although, most commonly it works best in the range of 35 to 39 weight percent. Other factors being equal, the higher the concentration of alumina in the mixing paste, the longer the time which will be required to achieve an extrudable paste. In any event, high concentrations of alumina will generally result in high compacted bulk density, and relatively low porosity.

On the other hand, more dilute systems will not be extrudable or, if extrudable, will give extrudates which are easily deformed during subsequent processing. In general, the calcined extrudates will be weaker by virtue of poor bonding between the particles.

In the most desirable range of alumina concentrations, such as 35 to 39 weight percent, a good balance is achieved between the key extrudate properties such as total porosity, crush strength, shrinkage during drying, compacted bulk density, attrition resistance, macroporosity, microporosity, and median pore diameters.

Within an optimized alumina concentration, the mixing time ($t_2$) has a profound effect on the macroporosity. For example, in a Simpson Mix Muller, mixing times of the order of 15-20 minutes will result in some, but not enough, macroporosity. On the other hand, increasing that time to 35 to 70 minutes will result in an appreciable increase in the macroporosity. Beyond the mixing time of the order of 70 minutes, the effect of additional mixing is generally small.

The increase in macroporosity results in an increase in the total porosity as measured by the mercury intrusion method. The mercury total pore volume of our extrudates ranges from about 1.15 to about 0.75 cm.$^3$/g., most commonly from about 1.00 to about 0.80 cm.$^3$/g., while still exhibiting excellent mechanical properties as indicated by average crush strength and low attrition losses below 7 percent, preferably below 5 volume percent.

The macropore volume with its large pores provides easy access for the material being treated to reach the small micropores where the high surface area resides. A minimum macropore volume of greater than 0.10 cm.$^3$/g. and preferably greater than 0.15 cm.$^3$/g. is desired. On the other hand, if there is too much macropore volume, then the extrudate becomes mechanically weak. As indicated above, good mechanical properties as measured by average crush strength, and attrition resistance can be obtained when the macroporosity is maintained within an upper limit of about less than 0.30 cm.$^3$/g., and preferably less than 0.25 cm.$^3$/g.

These changes in macroporosity are reflected by variations in the macropore median diameter. The products of this invention range in macropore median diameter from about 3,000 to about 7,000 Angstrom units, and preferably from about 4,000 to about 6,000 Angstrom units. These limits in porosity translate to limits in compacted bulk density. The product of our invention ranges in compacted bulk density from about 27 to about 38 pounds per cubic foot.

FEATURES OF THE INVENTION ILLUSTRATED BY THE DRAWINGS

The distribution of the different pore sizes in general and in the micropore region under various calcination conditions is illustrated in FIGS. 1–4.

FIG. 1 is a bar graph representing the mercury pore volume as a function of pore diameters for a specific bimodal pore size distribution alumina extrudate according to the present invention. For this extrudate the micropore region, characterized by small pores with a diameter of less than 500 Angstrom units, has a substantial pore volume of 0.694 cm.$^3$/g. The macropore region, characterized by large pores of 1,000 to 10,000 Angstrom units, has a pore volume of 0.245 cm.$^3$/g. Separating these two pore volume modes is a region of intermediate pores, characterized by pores of 500 to 1,000 Angstrom units, which has very little pore volume. In general it is less than 0.05 cm.$^3$/g. and in this specific example it has a value of 0.035 cm.$^3$/g. In other cases an even more preferred value is less than 0.03 cm.$^3$/g.

FIG. 2 represents a plot of pore size distribution commonly called a frequency plot. The abcissa represents the pore diameters (D) within the extrudate internal structure conveniently measured in Angstrom units, while the ordinate represents the derivative of the micropore volume (v) with respect to the pore diameter (D). Typically, for our products such plots of the micropore volume give a bell-shaped curve (K, L, M, N, O) with a single maximum at point M. Four parameters are often used to describe the nature of the pore size distribution, and they are as follows:
(1) The diameter at which the curve maximum occurs, ($D_m$) which is referred to as the diameter of maximum frequency.
(2) The largest pore diameter of that fraction of the smallest micropores which constitutes 5 percent of the micropore volume (represented by the symbol $D_5$).
(3) The smallest pore diameter of that fraction of the largest micropores which constitutes 5 percent of the micropore volume (represented by the symbol $D_{95}$). The symbol $D_{95}$ is selected because this limit obviously corresponds to the largest diameter of the smallest pores which constitute 95 percent of the micropore volume.
(4) The micropore volume median diameter, or more commonly, the median diameter. Here half of the micropore volume is made up of pores smaller than the median diameter, while the other half is made up of pores larger than the median diameter. The median diameter is represented by the symbol $D_{50}$. In general, $D_{50}$ and $D_m$ do not coincide, but they are close to each other.

For very uniform pore size distributions, the median diameter and the diameter of maximum frequency will nearly coincide, and both sides of the bell-shaped curve will be nearly symetrical. Furthermore the value of $D_{95}-D_5$ will be small such as 110 Angstrom units or less for materials calcined at about 1,000° F.

Referring to FIG. 2, the maximum frequency occurs at point M, and the diameter of maximum frequency occurs at point $D_m$. The area under the bell-shaped curve (K, L, M, N, O) represents the total micropore volume. The shaded area on the left, which is limited by line L-$D_5$ represents the smallest pores in the structure and amounts to 5 percent of the total micropore volume. The shaded area on the right, which is limited by line N-$D_{95}$, represents the largest pores in the microstructure and amounts to 5 percent of the total micropore volume. The blank area under the curve limited by $D_5$ and $D_{95}$ is defined as the "effective" pore volume fraction and constitutes 90 percent of the micropore volume. The range of diameters from $D_5$ to $D_{95}$ represent the "effective" pore size range within the microstructure.

A measure of the uniformity of the micropore size distribution is given by the ratio of the median diameter ($D_{50}$) to the effective pore size range ($D_{95}-D_5$). This ratio is called the uniformity factor, and is represented by the symbol U. Large relative values of U mean excellent uniformity, while small values mean poor uniformity. Mathematically the uniformity factor U is given by:

$$U = \frac{D_{50}}{D_{95} - D_5}$$

All of our products exhibit uniformity factors of greater than about 0.55, preferably greater than 0.60. Our most preferred products exhibit "U" values of greater than 0.70.

In practice, the pore size distribution curve is obtained from mercury porosimetry. The ordinate becomes the increment of the mercury volume forced into the structure ($\Delta v$) as the pressure is increased divided by the corresponding increment of the diameter ($\Delta D$) of the pores filled by the mercury as a result of the latest pressure increase. The abcissa becomes the mean diameter or average diameter of the pores filled by the corresponding penetration of mercury. Such plots are not always smooth, as the experimental data may show point to point irregularities. However, the experimental points may be used to draw a smooth curve which is representative of the pore size distribution of the material.

A variation which is also used in representing pore size distribution is a plot of $\Delta v/\Delta \log D$ versus D. The change to log D from D is simply a mathematical artifact. The distribution curves remain essentially unchanged; however, the areas under such curves no longer represent the micropore volume.

Figure 3:
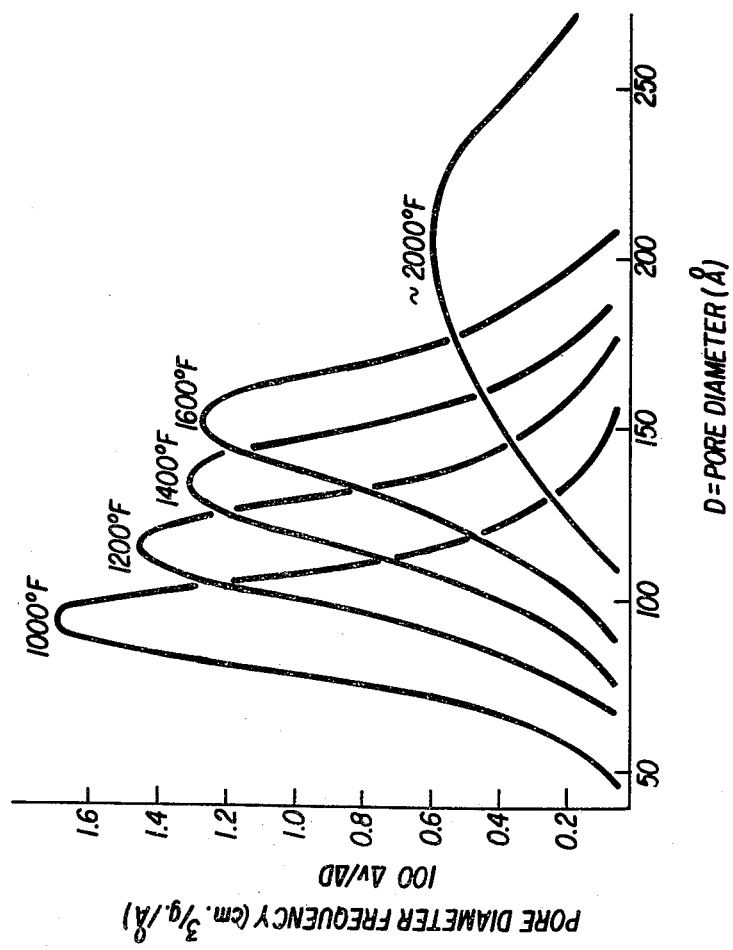
FIG. 3 represents plots of the micropore size distribution of extrudates calcined at various temperatures.

FIG. 3 shows plots of the pore size distribution of extrudates of the instant invention calcined at various temperatures. The abcissa represents the pore diameter in Angstrom units, and the ordinate represents the values of $\Delta v/\Delta D \times 100$, obtained from mercury porosimetry experimental data. The curves for 1,000°, 1,200°, 1,400°, and 1,600° F. correspond to the samples of Examples 13, 14, 15 and 16. The areas under these curves represent the micropore volumes 0.702, 0.711, 0.705 and 0.712 cm.$^3$/g. respectively.

Note how the distribution curves shift toward larger pore diameters as the temperature of calcination is increased even though the areas under the curves remain essentially constant. Also note the very uniform pore size distribution obtained in the range of 1,000° to 1,600° F. and the much broader pore size distribution shown at about 2,000° F.

The micropore size distribution has a very uniform nature for the materials calcined at different temperatures.

Figure 4:
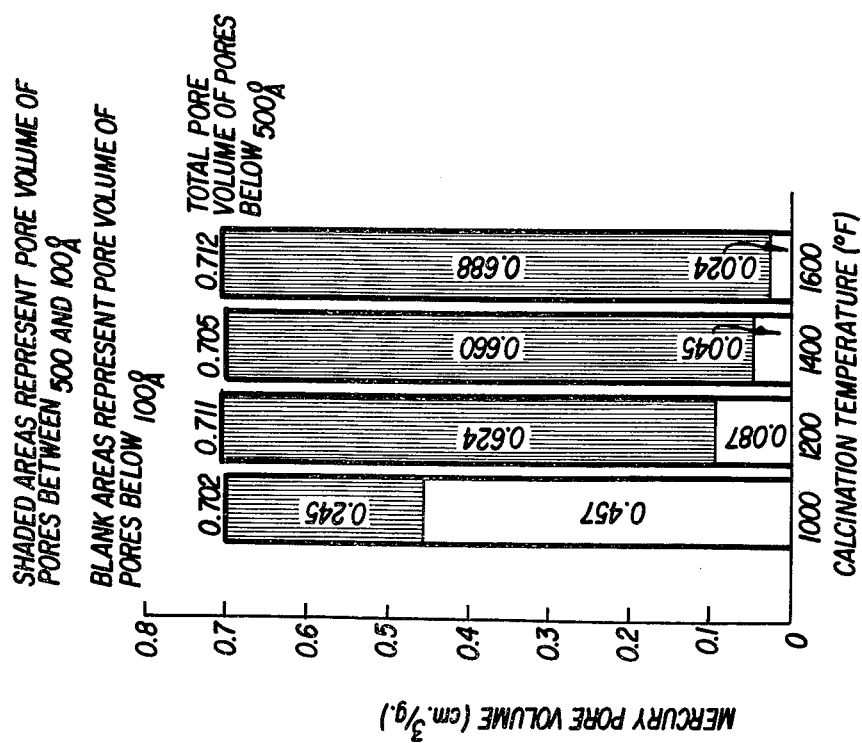
FIG. 4 represents the micropore volume in bar form for alumina extrudates calcined at different temperatures.

FIG. 4 is a graphical representation of the micropore volume in bar form for alumina extrudates calcined at different temperatures. The data displayed corresponds to the samples of Examples 13, 14, 15 and 16. The height of the bars represents the micropore volume obtained by mercury intrusion and expressed in cm.$^3$/g. Each bar represents a different calcination temperature (1,000°, 1,200°, 1,400,° and 1,600° F.).

Note the unusual and unexpected constancy of the micropore volume as all the bars have essentially identical height. This illustrates the thermal stability which is characterized by the micropore volume remaining essentially constant when the extrudates are subjected for two hours to calcinating temperatures between 1,000° F. and 1,600° F. Note also the pronounced variation in the relative proportions of pore volumes made up of pores above and below 100 Angstrom units (shaded versus blank areas).

OTHER FEATURES OF THE INVENTION

One unexpected result observed in the product of our invention is the constancy of the micropore volume under a variety of preparational conditions. It is apparent that the microporosity is dependent on the starting alumina powder and, in the case of Alumina B, it is essentially insensitive to the mixing and extruding conditions. The microporosity ranges from about 0.60 cm.$^3$/g. to about 0.85 cm.$^3$/g., most commonly from about 0.65 to about 0.80 cm.$^3$/g.

This constancy of the microporosity was found to hold even when the extrudates were calcined over a range of heating conditions. For example, essentially no variation in microporosity is observed between extrudates calcined at about 800° F. and the same extrudates calcined at about 1,700° F. In those cases where some variation occurs, the change usually begins at about 1,600° F. In other words, the microporosity between 800° and 1,600° F. is essentially constant; this is the range over which gamma alumina is generally stable. Over the temperature range of 1,000° to 1,900° F. the micropore volume will not change by more than 10 percent, preferably by no more than 5 percent. Over the temperature range in which gamma alumina is stable, the variation in micropore volume will not exceed 5 percent, preferably less than 2 percent. On the other hand, different thermal treatments result in changes in surface area. The greater the severity of the thermal treatment, the lower the surface area achievable. Surface areas may range from about 400 to about 80 m.$^2$/g., although in conjunction with some of the other desirable properties, the surface area ranges more likely between 300 and 100 m.$^2$/g. In a very specific embodiment, the materials to be used in automobile emission control devices exhibit preferably a surface area of from 80 to 140 m.$^2$/g.

It has been shown experimentally that the vast majority of the surface area resides in the micropores. It is clearly more than 95 percent, with many cases surpassing 97 percent. The extrudates described herein all have greater than 98 percent of the surface area coming from pores with diameters of 500 Angstrom units or less. Actually, in most of these cases, about 99 percent of the surface area resides in these micropores. From all of this, it follows that we can achieve by proper selection of the preparational conditions the right combination of micropore volume and surface area to control at will the average pore diameter or the median pore diameter of that portion of the structure where catalytic reactions occur. Average diameters of the micropore structure can be controlled to range from about 100 Angstrom units to about 300 Angstrom units, more desirably from about 120 to about 200 Angstrom units. From a pore size distribution point of view, the structure can be controlled to produce micro median diameters ranging from 90 to 210 Angstrom units more desirably from 100 to 150 Angstrom units and macro median diameters ranging from about 3,000 to about 7,000 Angstrom units, more desirably from about 4,000 to about 6,000 Angstrom units.

An additional, and most unexpected, result is that the product of our invention exhibits essentially no intermediate porosity. Once more, this particular characteristic appears to be insensitive to the manner in which the mixing step is carried out or the subsequent drying and calcination conditions. This unusual property, therefore, appears to be related to the nature of the starting alumina powder. The intermediate pore volume does not exceed 0.05 cm.$^3$/g., preferably 0.04 cm.$^3$/g., and most preferably 0.03 cm.$^3$/g.

With respect to the macroporosity, besides the unexpected result that the macropore volume can be controlled through the mixing step variables, it has been further established that the macropore volume is essentially insensitive to the calcination conditions. This is very important, in that access to the catalytic sites which reside in the micropores and which takes place through the macropores can be unimpeded and easy regardless of the specific nature of the micropore structure desired and of the calcination temperature used to attain it. In and out diffusion of reactants and products takes place quickly and effectively. This case of diffusion can be achieved regardless of the particular micropore size distribution and surface area prepared.

In summary, the product of our invention is a very unusual and unexpected alumina extrudate capable of being tailor made to fit a variety of catalytic needs. It exhibits a bimodal pore size distribution with a large, controllable, and stable macroporosity, which serves as an easy access path to catalytic sites. These sites exist on the controllable surface area located within micropores of controllable diameters. Finally, the absence of intermediate porosity provides a structure with direct connection between macroporosity and microporosity, therefore, facilitating direct access or diffusion from one region to the other. All these structural properties are achievable while maintaining excellent mechanical properties.

It is obvious to anyone skilled in the art that such a type of bimodal pore structure with the capability of controlling the extent of porosity, the distribution of pore sizes, and the distribution of surface area and with good mechanical properties will be very useful in the preparation of unique catalysts for many applications; most specifically for automobile exhaust catalysts and for processing of heavy hydrocarbons such as those found in resids or those obtainable from processing of coal.

EXAMPLE 1

A powder alumina made in accordance with Example 3 of the Sanchez et al Pat. No. 4,154,812 was employed as a starting material. This product consisted essentially of pure alpha alumina monohydrate with no detectable amounts of alpha or beta alumina trihydrates. The moisture content of the alumina powder was determined to be 35.4 weight percent. This moisture content can vary depending on the conditions used in making the starting material and the conditions under which the powder is stored. In this particular case, the original powder had a moisture of 29.6%, but upon storage in fiber drums over a period of several months, it picked up moisture.

A first portion of 2,325 g. of this alumina hydrate powder was selected which corresponded to 1,502 g. of Al$_2$O$_3$ on a dry basis, and this was added to a Simpson Mix Muller. To this was further added 3,405 g. of water which had been adjusted to a pH of 10.5 by the addition of ammonium hydroxide. This first mixture was mixed and mulled for 10 minutes ($t_1$) to obtain a homogeneous dispersion. Then the remaining charge of 2,325 g. of alumina hydrate which corresponded to 1,502 g. of dry basis alumina was added. This mixture was mulled for an additional 35 minutes ($t_2$) to intimately mix the alumina with the water and to obtain the desired energy input into the system. The mixture had a solids content of 37.3 percent.

After the mulling was stopped, the mixture was fed into a Welding Engineers Worm Extruder having a die with holes of 150 mils in diameter. The internal worm screw forced the mixture through the die holes and the extrusions were cut with a rotating blade which was synchronized with the rotation of the worm screw to achieve the desired length. After the torque became stable, the samples were collected. Within about two hours of the extrusion run the extrusions were placed in wire baskets and heated overnight at a temperature of 170° F. (77° C.) in an oven. This heating was done under high humidity conditions obtained by having a supply of water in the oven. The next morning the temperature was raised to 230° F. (110° C.) and maintained at this level for one hour.

After this drying procedure the materials were calcined by placing the materials in covered saggers and placing them in a furnace which was preheated to 1,200° F. (649° C.). The temperature was increased to about 1,850°–1,900° F. (1,010°–1,038° C.) over a three hour period. Finally the temperature was maintained at 1,850°–1,900° F. for one hour. The product was then cooled and covered for analysis and evaluation.

The following average results were obtained on the basis of several runs made under these conditions.

| Properties of the extrudates | Average Value | No. of Runs |
|---|---|---|
| Compacted bulk density (pcf) | 37.3 | 7 |
| Average crush strength (lbs.) | 17.8 | 7 |
| Average length (mils) | 206 | 7 |
| Average diameter (mils) | 125 | 7 |
| Average length to Diameter Ratio | 1.65 | 7 |
| Sieve Analyses (weight percent of indicated fraction) | | |
| On 5 mesh (+5) | 1 | 7 |
| Through 5, on 6 mesh (−5+6) | 18 | 7 |
| Through 6, on 7 mesh (−6+7) | 80 | 7 |
| Through 7, on 8 mesh (−7+8) | 1 | 7 |
| Through 8 mesh (−8) | 0 | 7 |
| Mercury Pore volume (cm.$^3$/g.): | | |
| • Macropores | 0.143 | 1 |
| • Intermediate pores | 0.022 | 1 |
| • Micropores | 0.642 | 1 |
| • Total | 0.807 | 1 |
| N$_2$ BET Surface area (m.$^2$/g.) | 111 | 1 |
| Water pore volume (cm.$^3$/g.) | 0.804 | 7 |
| Skeleton density (g./cm.$^3$) | 3.21 | 7 |
| Volume packing fraction | .665 | 7 |

Note the excellent agreement between total pore volume as measured by mercury intrusion and by water titration (0.807 and 0.804 cm.$^3$/g.) which indicates the absence of pores larger than 10,000 Angstrom units. Both of these figures are in excellent agreement with the value calculated using equation (1) which gives 0.801 cm.$^3$/g.

The data clearly show that the extrudates exhibit an open structure consisting of two distinct pore volumes. A micropore volume of 0.642 cm.$^3$/g., which corresponds to about 80% of the total pore volume, a macropore volume of 0.143 cm.$^3$/g. which corresponds to about 18% of the total pore volume and a very small fraction of intermediate pores (under 3% of the total). It is evident that the pore structure of these extrudates exhibits a bimodal distribution.

In spite of the open structure of these extrudates, they exhibit excellent mechanical properties as evidenced by the average crush strength of 17.8 lbs.

EXAMPLES 2-4

In these examples studies were made to establish the effect of the mixing or mulling time (t$_2$) on the support properties. Additional extrudates were formed according to the process set forth in Example 1, except that the time (t$_2$) that the entire mixture was subjected to mixing in the muller was varied from the 35 minutes of Example 1 to periods of up to 180 minutes. The mixtures became easier to extrude and the energy expended by the motor in extruding decreased in value as the mulling time increased. The extrudates formed had the following properties after drying and calcination following the techniques described in Example 1:

| EXAMPLES 1-4 | | | | |
|---|---|---|---|---|
| | Ex. 1 | Ex. 2 | Ex. 3 | Ex. 4 |
| Alumina Powder | B | B | B | B |
| Solids Content (wt. %) | 37.3 | 37.3 | 37.3 | 37.3 |
| Mixing Time (t$_2$) (min.) | 35 | 50 | 90 | 180 |
| Approximate Torque (lb.) | 30 | 28 | 11 | 11 |
| Observations: | | | | |
| Paste Viscosity | Good | Good | Low | Low |
| Extrudability | Good | Good | Good | Good |
| Load on Extruder | Normal | Normal | Low | Low |
| EXTRUDATE PROPERTIES: | | | | |
| Compacted Bulk Density (pcf) | 37.3 | 34.9 | 32.6 | 33.1 |
| Average Crush Strength (lb) | 17.8 | 15.6 | 13.0 | 16.0 |
| Average diameter (in) | 0.125 | 0.129 | 0.125 | 0.126 |
| Sieve Analyses (wt. % of Indicated Fraction) | | | | |
| +5 mesh | 1 | 0 | 1 | 9 |
| −5+6 mesh | 18 | 9 | 10 | 19 |
| −6+7 mesh | 80 | 90 | 88 | 68 |
| −7+8 mesh | 1 | 1 | 1 | 3 |
| −8 mesh | 0 | 0 | 0 | 1 |
| Mercury Pore Volume (cm.$^3$/g.): | | | | |
| • macropores | 0.143 | 0.245 | 0.226 | 0.216 |
| • intermediate pores | 0.022 | 0.035 | 0.045 | 0.033 |
| • micropores | 0.642 | 0.694 | 0.705 | 0.696 |
| • Total | 0.807 | 0.974 | 0.976 | 0.945 |
| Surface Area (m.$^2$/g.) | 111 | — | 112 | 112 |
| Average Micropore Diameter Å | 233 | — | 252 | 249 |
| Approximate Diameter of Max. Freq. (Dm.) Å | 180 | 170 | 170 | 170 |
| Micromedian Diameter (D$_{50}$) Å | 196 | 172 | 177 | 171 |
| Macromedian Diameter (M D$_{50}$) (in thousands of Å) | 3.7 | 6.0 | 6.2 | 6.4 |
| Alumina Crystalline Phase | Theta | Theta | Theta | Theta |

Note the bimodal pore size distribution of all samples and the essentially constant values of the micropore volume (all materials falling within ±5% of the mean micropore volume). Note also in all examples, the low value of the intermediate porosity and the marked increase in macroporosity upon increasing the mixing time. However, the data show that beyond a given mixing time, which in this set is about 50 minutes, there is essentially no further change in the macroporosity.

Note also that in spite of the marked increase in the macroporosity as t$_2$ is increased, that the pore size distribution within the micropores is essentially constant as evidenced by the very small variability in either the average micropore diameters, the median diameters or the diameters of maximum frequency as well as the constancy of the BET surface areas.

Note also the very large macro median diameters which range from about 3,700 to about 6,400 Angstrom units which are significantly much larger than the micromedian diameters.

Finally, in spite of the low densities and high total pore volumes, these extrudates exhibit good mechanical properties as evidenced by the high average crush strengths.

EXAMPLES 5-9

In these examples, studies were made to establish the effect of varying the solids content and the mulling time. The conditions set forth in Example 1 were followed except that the solids content and the mulling times were varied as set forth below:

EXAMPLES 5-9

| | Ex. 5 | Ex. 6 | Ex. 7 | Ex. 1 | Ex. 8 | Ex. 9 |
|---|---|---|---|---|---|---|
| Alumina Powder | B | B | B | B | B | B |
| Solids Content | 40.0 | 39.0 | 39.0 | 37.3 | 35.0 | 35.0 |
| Mixing time | 300 | 75 | 100 | 35 | 35 | 15 |
| Approximate Torque (lbs) | ~50 | ~50 | 43 | 30 | 11 | 11 |
| Observations: | | | | | | |
| Paste Viscosity | ←Very Thick→ | | Thick | Normal | Acceptable | Acceptable |
| Extrudability | ←None→ | | Poor | Good | Adequate | Adequate |
| Load on Extruder Motor | ←Overloaded→ | | Almost | Normal | Low | Low |
| | ←No Product→ | | Overloaded | | | |
| Extrudate Properties: | | | | | | |
| Compacted Bulk Density (pcf) | — | — | 40.0 | 37.3 | 30.4 | 28.1 |
| Average Crush Strength | — | — | 16.0 | 17.8 | 13.3 | 13.0 |
| Average Length (mils) | — | — | 206 | 206 | 206 | 206 |
| Average Diameter (mils) | — | — | 120 | 125 | 127 | 130 |
| Length to Diameter Ratio | — | — | 1.72 | 1.65 | 1.62 | 1.58 |
| Sieve Analyses (wt. % of indicated fraction) | | | | | | |
| +5 | — | — | 0 | 1 | 2 | 9 |
| −5+6 | — | — | 1 | 18 | 65 | 54 |
| −6+7 | — | — | 98 | 80 | 30 | 30 |
| −7+8 | — | — | 1 | 1 | 2 | 4 |
| −8 | — | — | 0 | 0 | 2 | 3 |
| Mercury Pore Volume (cm.$^3$/g.) | | | | | | |
| • Macropore | — | — | 0.179 | 0.143 | 0.172 | 0.174 |
| • Intermediate Pores | — | — | 0.045 | 0.022 | 0.033 | 0.033 |
| • Micropores | — | — | 0.578 | 0.642 | 0.690 | 0.696 |
| ○ Total | — | — | 0.802 | 0.807 | 0.895 | 0.903 |
| Micromedian diameter ($D_{50}$) Å | — | — | 162 | 196 | 197 | 195 |
| Macromedian diameter M $D_{50}$ (in thousands of Å) | — | — | 4.3 | 3.7 | 6.3 | 5.8 |
| Attrition Percent* | — | — | — | — | 2.9 | — |
| Alumina Crystalline Phase | — | — | Theta | Theta | Theta | Theta |

*performed after noble metal impregnation on a finished catalyst (Example 17)

These examples illustrate that for this particular alumina powder the nominal solids content, within a relatively narrow range, has a significant effect on the ability to extrude. When the solids content is as high as 39.0 weight percent, there must be a considerable mulling period to obtain a paste that is capable of extrusion. At 40 percent solids, the paste cannot be extruded even after 300 minutes of mixing.

When the solids content is low, such as 35.0 weight percent, shorter mulling periods may be employed. Note that at higher alumina concentration, a product with high density is obtained (40 pcf); however, at low concentration, the compacted bulk density goes to a low level of about 28 pcf with a range of 27 to 38 pcf being desired according to the present invention. The low density is the direct result of the high porosity of the product, in particular the macroporosity which is greater than 0.17 cm.$^3$/g. For Examples 8 and 9 equation (1) gives a total pore volume of about 1.05 to 1.15 cm.$^3$/g. which indicates the presence of super macroporosity with a portion of pores above 10,000 Angstrom units (the upper limit for the mercury intrusion method). In spite of the very open structures, these materials show good mechanical properties as evidenced by the average crush strength of about 13 lbs. and the excellent attrition resistance of under 3 percent. The micro and intermediate porosities remain essentially unaltered by the mixing conditions except in Example 7, in which the microporosity is somewhat low. This appears to be due to the partial collapse of internal structure as a result of the extreme mechanical energy used during mixing and mulling (very long time at very high viscosity due to very high alumina concentration). Some of the pores were most likely lost by crushing or extreme shearing under these severe mixing and mulling conditions. Such extreme conditions of mixing are not normally used in manufacturing processes.

EXAMPLES 10 and 11

These examples were performed to determine the ability of different aluminas to form extrudates with a bimodal pore size distribution. Three alumina powders were selected for this study: Alumina A, which has been previously described on page 20 as a commercially available alumina and which represents the group of reactive aluminas with a definite pseudoboehmitic nature; Alumina C, which is another commercially available alumina previously described on page 21 which represents a group of more crystalline materials with boehmitic nature, and lower reactivity than A; and Alumina B, which is the boehmite-pseudoboehmite intermediate of controlled intermediate crystallinity used in Examples 1 through 9. All three powders are microcrystalline alpha alumina monohydrates of excellent chemical purity. Other key properties of these aluminas are shown in Table I.

TABLE I

| | ALUMINA | | |
|---|---|---|---|
| Property | A | B | C |
| [020] d-spacing Å | 6.5 | 6.2–6.5 | 6.2 |
| Crystalline nature | pseudo-boehmite | intermediate | boehmite |
| Relative Crystallinity (%) | 69 | 70–85 | 99 |
| [020] Half Intensity Width Å | 1.64 | 1.65–1.85 | 1.01 |

TABLE I-continued

| Property | ALUMINA | | |
|---|---|---|---|
| | A | B | C |
| Titration Number | 153 | 130–180 | 92 |
| Crystalline impurities | Traces | None | Traces |

All three alumina powders were converted into ⅛ inch extrudates in the same equipment described in Example 1 following the method of Example 1, except that the solids contents were somewhat varied to achieve similar conditions of paste consistency and extrudability. The wet extrudates were processed through the remaining steps in the same manner as in Example 1. Results are given in Table II, which includes two examples using Alumina B and one example each from Aluminas A and C.

TABLE II

| | Example No. | | | |
|---|---|---|---|---|
| | Ex. 10 | Ex. 1 | Ex. 8 | Ex. 11 |
| Alumina Powder | A | B | B | C |
| Solids Content | 39.0 | 37.3 | 35.0 | 44.0 |
| Mixing time (t₂) (min.) | 35 | 35 | 35 | 35 |
| Approximate Torque (lb.) | 27 | 30 | 11 | 40 |
| Observation: | | | | |
| Paste Viscosity | Good | Good | Acceptable | Good |
| Extrudability | Good | Good | Acceptable | Good |
| Load on Extruder | Normal | Normal | Low | Acceptable |
| EXTRUDATE PROPERTIES | | | | |
| Compacted bulk density (pcf) | 41.9 | 37.3 | 30.4 | 42.8 |
| Average Crush Strength | 9.6 | 17.8 | 13.3 | 8.1 |
| Average Diameter (mils) | 121 | 125 | 127 | 123 |
| Mercury Pore Volume (cm.³/g.): | | | | |
| • macropores | 0.016 | 0.143 | 0.172 | 0.044 |
| • intermediate pores | 0.012 | 0.022 | 0.033 | 0.014 |
| • micropores | 0.746 | 0.642 | 0.690 | 0.541 |
| • Total | 0.774 | 0.807 | 0.895 | 0.599 |
| Surface Area (m.²/g.) | 108 | 111 | — | 102 |
| Attrition (wt. %) | 18.5 | — | 2.9* | 15.3 |
| Alumina Crystalline Phases | Theta | Theta | Theta | Theta |
| Crystalline impurities | Trace α—Al₂O₃ | None | None | None |

*performed after noble metal impregnation of a finished catalyst(Example 17)

Results clearly show that Alumina A exhibits a monomodal pore size distribution with essentially all pores falling in the micropore region (greater than 96% of the total pore volume). Its macroporosity is practically non-existent (about 2% only). Alumina C shows a small fraction of macropores (0.044 cm.³/g. or about 7% of total). It exhibits a total porosity of under 0.600 cm.³/g. which is responsible for the high density of 42.8 pcf. In contrast, Alumina B shows a clearly defined bimodal pore size distribution with macropore volumes of 0.143 and 0.172 cm.³/g., and substantial micropore volumes of 0.642 and 0.690 cm.³/g. The total pore volumes of 0.807 and 0.895 cm.³/g. indicate an open pore structure, more so than for Aluminas A and C. In spite of this, the mechanical properties of Alumina B extrudates are superior. For example, the crush strength is about twice the value of the other two materials in one instance (17.8) and clearly substantially larger (13.3) in the other. The attrition of the extrudates from aluminas A and C are unacceptably excessive at 18.5 and 15.3 respectively, whereas the value for Examples 8 is a very low value of 2.9 percent.

EXAMPLE 12—Comparison

This example was performed to determine the effect of crystalline purity on the properties of finished extrudates. Two types of aluminas were used for these comparative experiments. Alumina B, which has been previously described, and Alumina Beta, which was a deliberately degraded precursor of Alumina B, exhibiting high levels of beta alumina trihydrate. This was achieved by aging for long periods of time the washed filter cake in an Alumina B preparation. This aging formed the undesirable beta alumina trihydrate although the predominant crystalline phase remained alpha alumina monohydrate. After aging, the filter cake was spray dried as in normal practice to produce Alumina Beta in powder form. Extrudates were preparated by the same generic process and using the same equipment used in Example 1. Results were:

TABLE III

| | Example No. | |
|---|---|---|
| | 1 | 12 |
| Alumina Powder | B | Beta |
| Solids Content (wt. %) | 37.3 | 39.7 |
| Mixing Time (t₂) (min.) | 35 | 44 |
| Approximate Torque (lb.) | 30 | 30 |
| Observations: | | |
| Paste Viscosity | Good | Good |
| Extrudability | Good | Good |
| Load on Extruder Motor | Normal | Normal |
| EXTRUDATE PROPERTIES: | | |
| Compacted Bulk Density | 37.3 | 42.0 |
| Average Crush Strength | 17.8 | 12.4 |
| Average Diameter (mils) | 125 | 115 |
| Sieve Analyses (wt. % of indicated fraction) | | |
| +5 mesh | 1 | 0 |
| −5+6 mesh | 18 | 1 |
| −6+7 mesh | 80 | 89 |
| −7+8 mesh | 1 | 2 |
| −8 mesh | 0 | 8 |
| Mercury Pore Volume: | | |
| • micropores | 0.143 | 0.002 |
| • intermediate pores | 0.022 | 0.017 |
| •micropores | 0.642 | 0.644 |
| • Total | 0.807 | 0.663 |
| Surface Area (m.²/g.) | 111 | 92 |
| Alumina Crystalline Phase | Theta | Theta and Alpha |

Note that in order to achieve good extrusion characteristics, the paste from Alumina Beta had to exhibit higher solids contents and required slightly longer mixing time. Note also that Alumina Beta gave an increased density and a marked increase in shrinking during further processing as evidenced by a decrease in the diameter of the extrudates (from 125 to 115 mils). This is further evidenced by a marked shift in the sieve analyses from the −5+6 mesh fraction to the smaller mesh fractions. All of these changes are significant; however, the most profound effect is seen in the nearly complete disappearance of the macroporosity (0.002 cm.³/g. or about 0.3% of the total) even though the microporosity remained unchanged at about 0.64 cm.³/g. In other words, the decrease in total pore volume from about 0.81 to about 0.67 cm.³/g. caused by the presence of beta alumina trihydrate was achieved through the disappearance of the macropore volume (0.14 cm.$^3$/g.) of the extrudates from Alumina B.

The extrudates from Alumina Beta are definitely monomodal in pore size distribution.

EXAMPLES 13–16

The purpose of these examples was to determine the effect of calcination temperature on the microstructure of the extrudates prepared from Alumina B powders.

The particular alumina powder used falls within the specifications set forth in U.S. Pat. No. 4,154,812, to Sanchez et al, which we call Alumina B; but it was not the same material used in Example 1.

The powder was mixed and extruded in the equipment described in Example 1, except that the extrusion die was changed to produce 1/16 inch diameter wet extrudates.

The specifics of this preparation were as follows: Five hundred grams of alumina powder with a loss on ignition of 28.8% was mixed in the mix muller with 875 grams of water. The resulting mix was dispersed for 10 minutes ($t_1$), after which a second charge of 500 grams of powder was added. Mixing was then continued for 25 minutes ($t_2$). The resulting paste had a nominal alumina content of 38.0% by weight. This paste was then fed into the extruder. The extrusion proceeded smoothly at a torque of about 30 pounds. The extruding paste was cut with the rotating blade synchronized to achieve an extrudate length of approximately 160 to 220 mils. The extrudates were then dried in wire baskets overnight in an oven of controlled humidity at 170° F. The dried extrudates were then divided into several portions which were calcined in air in electric furnaces at different temperatures ranging from 1,000° to 1,600° F. for two hours. The resulting extrudates were carefully examined by different techniques. The data obtained in this set of experiments are the basis for the results shown in FIGS. 2 and 3. Key results are given in Table IV.

TABLE IV
EFFECTS OF CALCINATION TEMPERATURE ON EXTRUDATES FROM ALUMINA B

| | Examples | | | |
|---|---|---|---|---|
| | 13 | 14 | 15 | 16 |
| Calcination Temperature (°F.) | 1,000 | 1,200 | 1,400 | 1,600 |
| EXTRUDATE PROPERTY | | | | |
| Average Diameter (mils) | ←54→ | | | |
| Average Length (mils) | ←140–190→ | | | |
| Compacted Bulk Density (pcf) | ←35–36→ | | | |
| N$_2$ BET Surface Area (m.$^2$/g.) | 226 | — | 185 | 158 |
| Nitrogen Micropore Volume (cm.$^3$/g.) | 0.73 | — | 0.74 | 0.71 |
| Mercury Micropore Volume (cm.$^3$/g.) | 0.702 | 0.711 | 0.705 | 0.712 |
| Mercury Pore Volume of Pores Below 100 Å (cm.$^3$/g.) | 0.457 | 0.087 | 0.045 | 0.024 |
| Surface Area of Micropores (m.$^2$/g.) | 224 | — | 184 | 156 |
| % of BET Surface Area Present in Micropore Structure | >99 | — | >99 | 98 |
| Diameter of max. freq. ($D_m$) Å | 95 | 110 | 130 | 150 |
| Median Diameter ($D_{50}$) Å | 94 | 118 | 131 | 148 |
| $D_5$ in Å | 67 | 89 | 98 | 104 |
| $D_{95}$ in Å | 148 | 175 | 178 | 217 |
| Effective range of pore diameters ($D_{95}$–$D_5$) Å | 81 | 86 | 80 | 113 |

TABLE IV-continued
EFFECTS OF CALCINATION TEMPERATURE ON EXTRUDATES FROM ALUMINA B

Note the close agreement between the mercury and nitrogen micropore volumes, but more significantly the constant value of the micropore volume over the entire temperature range. The values for the mercury micropore volumes, 0.702, 0.711, 0.705 and 0.712, are all essentially the same, varying no more than 2 percent. This is unexpected as other aluminas give decreasing micropore volumes as the calcination temperature is increased. Within the constant micropore volume, the pore size distribution, however, changes profoundly as a function of calcination temperature, as evidenced by the dramatic variation in the pore volume of pores below 100 Å which decreases regularly from about 0.45 cm.$^3$/g. at 1,000° F. to about 0.02 cm.$^3$/g. at 1,600° F. Graphical representations of these variations in pore size distribution are given in FIG. 3. These changes are accompanied by decreases in surface area, increases in median diameter ($D_{50}$) which are paralleled very closely by increases in the value of the most frequent diameter ($D_m$). Note also that the range of effective pores shifts toward larger diameters as the calcination temperature is increased, yet the value of ($D_{95}$-$D_5$) itself does not change much, particularly below 1,600° F. (values of 81, 86, 80 and 113 Angstrom units). This means that the micropore volume is contained in micropores having diameters that are close to the median micropore diameter. In other words, the extrudates exhibit a very uniform micropore size distribution.

Finally, note that in all these structures, the surface area of the micropores is essentially equal to the BET surface area with values of greater than 98% of the BET surface area.

All of these profound and significant changes can be controlled by the proper selection of calcination conditions.

EXAMPLE 17

This example was carried out for the purpose of establishing the ability of the extrudates of the instant invention to be converted into catalysts of superior quality. For this purpose, the extrudates of Example 8 were dusted and screened through a No. 7 mesh U.S. sieve. Approximately 97% of the weight of the extrudates were collected, with about 3% going through the sieve which were discarded. The water pore volume of the on 7-mesh fraction was determined to be 0.880 cm.$^3$/g., which is very close to the total pore volume as measured on the entire sample by the mercury intrusion method (0.895 cm.$^3$/g.). The implication of this very close agreement is that the porosity of the extrudates from Example 8 does not include essentially any pores with diameters larger than 10,000 Angstrom units.

A 300 ml. portion of the screened extrudates was impregnated to incipient wetness using 132 ml. of a platinum and palladium sulfito complex solution. The preparation technique of the solution and the method of impregnation are the same as those used in Example 11 of U.S. Pat. No. 4,254,823 to Sanchez et al. Once impregnation was completed, the extrudates were placed on a screen and dried overnight at 320° F. (160° C.) in a forced draft oven. The dried catalyst was then activated at 800° F. (427° C.) for one hour in air.

The resulting catalyst contained an average 0.2561 mg. of platinum and 0.1004 mg. of palladium per ml. of compacted bulk catalyst, which are within the levels specified for commercial automobile emission control oxidation catalysts.

The catalyst was for attrition resistance using the procedure described earlier. A loss of 2.9 weight percent was measured, which is an excellent result considering the very open pore structure of the material.

The catalyst was also tested for thermal shrinkage using the procedure described earlier. A shrinkage of only 3.18 volume percent (average of two determinations) was observed. This measurement illustrates the nature of our extrudates which normally exhibit a shrinkage of less than 6 percent, preferably less than 5 percent. These low numbers also are indicative of a very stable pore structure under severe thermal treatments.

The oxidation activity of this catalyst was tested both fresh and after the thermal aging used in the shrinkage test (24 hours at 1,800° F.) using the bench test procedures described in column 25, lines 10 through 31, of U.S. Pat. No. 4,154,812 to Sanchez et al. Results are given in Table V together with those determined on a reference commercial catalyst certified by the EPA procedures as meeting the 1974 Automotive Emission Standards.

TABLE V

Comparison of Catalytic Activity

| Catalytic Parameter | Catalyst of Example 17 | Reference Catalyst |
|---|---|---|
| Fresh: | | |
| $t_{50}$ CO (seconds) | 52.4 | 66.2 |
| $t_{50}$ Hydrocarbons | 130.8 | 405.0 |
| CO Efficiency (% Conversion) | 99.4 | 99.1 |
| Hydrocarbon Efficiency (% conversion) | 76.1 | 54.2 |
| Thermally Aged: | | |
| $t_{50}$ CO (Seconds) | 66.7 | 105.4 |
| CO Efficiency (% Conversion) | 99.1 | 99.1 |
| Hydrocarbon Efficiency (% Conversion) | 40.7 | 37.6 |

Note that the catalyst of Example 17 is appreciably better than the reference EPA certified catalyst in light off characteristics and in hydrocarbon activity, both fresh and after thermal aging. The improved light off properties ($t_{50}$ CO and $t_{50}$ Hydrocarbon) stem from the low density of the catalyst and resulting low thermal inertia during heat-up. The superior hydrocarbon activity is due to the ease of diffusion of the large hydrocarbon molecules through the macropore structure and into the catalytic sites in the micropore structure where the surface area resides.

The certified commercial reference catalyst was prepared on extrudates of the type described in Example 10, which exhibit a compacted bulk density of about 42 pcf, and essentially no macropore volume. The concentrations of the noble metals in this reference catalyst were essentially identical to those of the catalyst of Example 17 (about 0.25 mg. of platinum and 0.10 mg. of palladium per ml. of compacted bulk catalyst).

EXAMPLES 18, 19, 20, 21, 22 and 23

This series of examples illustrates the use of washed filter cake and alumina powder mixtures to prepare good quality extrudates of ⅛ inch diameter. By using mixtures of filter cake and powder, appreciable saving can be obtained during manufacture since a good portion of the starting alumina going into the extrudates would not have to be processed through a preliminary drying step.

For this series, the starting materials were the Alumina B used in Example 1, with a moisture content of 29 weight percent, and an $Al_2O_3$ content of 71 weight percent; and a washed filter cake of an Alumina B preparation prior to the final drying step, with a moisture content of 74 weight percent and $Al_2O_3$ content of 26 weight percent. The procedure consisted of placing a given weight of filter cake in the mix muller described in Example 1, adding 1,000 grams of alumina powder and mixing and mulling the resulting mixture for a period of 30 minutes. From this point on, the extrusion operation, rounding of the edges, drying and calcination, were carried out in the same manner described in Example 1. Table VI gives the data on the preparation of the extrudates as well as the compacted bulk density and average crush strength of the products obtained.

TABLE VI

| | Example Number | | | | | |
|---|---|---|---|---|---|---|
| | 18 | 19 | 20 | 21 | 22 | 23 |
| Weight of Powder (g.) | 1,000 | 1,000 | 1,000 | 1,000 | 1,000 | 1,000 |
| Weight of Filter Cake (g.) | 1,850 | 1,900 | 2,050 | 2,200 | 2,600 | 3,000 |
| Total Weight (g.) | 2,850 | 2,900 | 3,050 | 3,200 | 3,600 | 4,000 |
| Weight of $Al_2O_3$ from | | | | | | |
| - Powder (g.) | 710 | 710 | 710 | 710 | 710 | 710 |
| - Filter Cake (g.) | 481 | 494 | 533 | 572 | 676 | 780 |
| - Total (g.) | 1,191 | 1,204 | 1,243 | 1,282 | 1,386 | 1,490 |
| Weight % of $Al_2O_3$ in mix from: | | | | | | |
| - Powder | 59.6 | 59.0 | 57.1 | 55.4 | 51.2 | 47.7 |
| - Filter Cake | 40.4 | 41.0 | 42.9 | 44.6 | 48.8 | 52.3 |
| Nominal weight % of $Al_2O_3$ in mix | 41.8 | 41.5 | 40.8 | 40.1 | 38.5 | 37.2 |
| Extruding Torque (lb.) | 40 | 35 | 27 | 20 | 10 | 5 |
| Extrudability | None | Difficult | Good | Good | Acceptable | None |
| Compacted Bulk Density (pcf) | — | 37 | 36 | 35 | 34 | — |
| Average Crush Strength (lb.) | — | 13.5 | 13.5 | 12.6 | 12.0 | — |

As the amount of filter cake was increased from 481 grams to 780 grams, the nominal concentration of alumina in the mix decreased from about 42 percent to about 37 percent. Both ends of the series, the most concentrated and the least concentrated, could not be extruded. In one case, the product was too dry and the extrudates tended to crumble, while in the other the extrudates were too soft and could not be cut. In the intermediate concentration range, satisfactory extrudates were prepared. There is a clearly defined trend in the compacted bulk density which closely parallels the concentration of alumina in the mix. Also there is a gradual decrease in crush strength as the density decreases. However, in all cases the crush strength was equal to or greater than 12 pounds.

Examples 24 and 25

These examples illustrate the superior effect of acidic additives, such as aluminum nitrate, on the mechanical properties of ⅛ inch extrudates.

The materials used in these examples were the alumina powder B and the washed filter cake used in Examples 18-23, and aluminum nitrate. The preparation was carried out in the same equipment and followed the techniques described in Examples 18-23, except that the aluminum nitrate was added to the mixture ten minutes into the mixing step. The resulting paste was further mixed and mulled for an additional twenty minutes. The extrusion step, rounding of the edges, drying and calcining was carried out in the same manner as in Examples 18-23.

Table VII gives the data on the preparation of the extrudates together with the average crush strength of the products prepared. The table also includes the data of Example 22 for comparison purposes, since this material was prepared under the same conditions but did not contain aluminum nitrate.

TABLE VII

| | Example number | | |
|---|---|---|---|
| | 22 | 24 | 25 |
| Weight Alumina Powder (g.) | 1,000 | 1,000 | 1,000 |
| Weight of Filter Cake (g.) | 2,600 | 2,600 | 2,600 |
| Total Weight (g.) | 3,600 | 3,600 | 3,600 |
| Weight percent of Al$_2$O$_3$ in mix | 38.5 | 38.5 | 38.5 |
| Mixing Time prior to Aluminum Nitrate Addition (minutes) | 10 | 10 | 10 |
| Amount Aluminum Nitrate used (expressed as equivalent Al$_2$O$_3$)(g.) | 0 | 6.9 | 27.7 |
| Weight percent of Al$_2$O$_3$ from aluminum nitrate | 0 | 0.5 | 2.0 |
| Mixing time after aluminum nitrate addition (min.) | 20 | 20 | 20 |
| Total Mixing Time (min.) | 30 | 30 | 30 |
| Extruding Torque (lb.) | 10 | 25 | 25 |
| Extrudability | Acceptable | Good | Good |
| Average Crush Strength (lb). | 12.0 | 22.9 | 26.7 |

In this series, the only independent variable is the addition of aluminum nitrate at different concentration levels (none for Example 22 and 0.5 and 2 percent, respectively, for Examples 24 and 25). Here the addition of aluminum nitrate resulted in a sharp increase in the extruding torque, which brought the extrusion operation into a good operating range. In addition, extrudates were obtained having extremely good crush strength. The effect of a small amount of aluminum nitrate about doubled the crush strength.

EXAMPLES 24 and 25

This example provides specific detailed data on the pore size distribution of the extrudates of Example No. 2 as determined by mercury intrusion techniques. The detailed data is the basis for the graphical representation given in FIG. 1.

| Pore Diameter (D) (Angstrom Units) | Cumulative Pore Volume of Pores with Diameters ranging from 35 Angstroms to D (cm.$^3$/g.) |
|---|---|
| 35 | 0 |
| 40 | 0.0220 |
| 50 | 0.0343 |
| 60 | 0.0467 |
| 70 | 0.0583 |
| 80 | 0.0689 |
| 90 | 0.0799 |
| 100 | 0.0908 |
| 120 | 0.0927 |
| 140 | 0.1489 |
| 160 | 0.2628 |
| 180 | 0.4049 |
| 200 | 0.5059 |
| 300 | 0.6487 |
| 400 | 0.6830 |
| 500 | 0.6939 |
| 600 | 0.7065 |
| 700 | 0.7266 |
| 1,000 | 0.7287 |
| 2,000 | 0.7623 |
| 3,000 | 0.7856 |
| 4,000 | 0.8085 |
| 5,000 | 0.8279 |
| 6,000 | 0.8523 |
| 7,000 | 0.8824 |
| 8,000 | 0.9039 |
| 9,000 | 0.9349 |
| 10,000 | 0.9740 |

EXAMPLE 27

This example illustrates the uniformity of micropore size distribution about the micromedian pore diameter, $D_{50}$, by providing the data for the calculation and the uniformity factor, U, for selected preferred extrudates according to the present invention.

| Example | $D_{95}$ (Å) | $D_5$ (Å) | $D_{95}-D_5$ | $D_{50}$ | U |
|---|---|---|---|---|---|
| 1 | 346 | 128 | 218 | 196 | 0.90 |
| 2 | 331 | 50 | 281 | 172 | 0.61 |
| 3 | 355 | 59 | 296 | 177 | 0.60 |
| 4 | 341 | 63 | 278 | 171 | 0.62 |
| 7 | 320 | 45 | 275 | 162 | 0.59 |
| 8 | 366 | 105 | 261 | 197 | 0.75 |
| 9 | 361 | 97 | 264 | 195 | 0.74 |
| 13 | 148 | 67 | 81 | 94 | 1.16 |
| 14 | 175 | 89 | 86 | 118 | 1.37 |
| 15 | 178 | 98 | 80 | 131 | 1.64 |
| 16 | 217 | 104 | 113 | 148 | 1.31 |

What is claimed is:

1. A thermally stable, bimodal extrudate consisting essentially of a pure transition alumina suitable for use as a catalyst support having a substantial first micropore volume made of relatively small pores having a pore diameter of less than 500 Angstrom units, a second macropore volume made of relatively large pores with a pore diameter in the range of 1,000 to 10,000 Angstrom units, and with very little intermediate pore volume made of pores with a pore diameter in the range of 500 to 1,000 Angstrom units, said alumina extrudate having
- a first micropore volume, as measured by mercury porosimetry, having pore diameters of 500 Angstrom units or less, of about 0.60 to about 0.85 cm.$^3$/g.;
- a second macropore volume, as measured by mercury porosimetry having pore diameters in the range of 1,000 to 10,000 Angstrom units, of about 0.10 to less than 0.30 cm.$^3$/g.;
- an intermediate pore volume, as measured by mercury porosimetry, having pore diameters in the range of 500 to 1,000 Angstrom units, of less than about 0.05 cm.$^3$/g.;
- said micropore volume having a median pore diameter of 90–210 Angstrom units and having a relatively narrow effective pore size distribution about the median pore diameter with a value of greater than 0.55 for the uniformity factor, U, given by the formula $$U = \frac{D_{50}}{D_{95} - D_5}$$

where
- $D_{50}$ is the micropore volume median diameter,
- $D_{95}$ is the smallest pore diameter of that fraction of the largest micropores which constitutes 5 percent of the micropore volume, and
- $D_5$ is the largest pore diameter of that fraction of the smallest micropores which constitutes 5 percent of the micropore volume;
- the surface area within said micropore volume being greater than 95 percent of the total surface area measured by nitrogen adsorption;
- an average crush strength given by the formula $$ACS > kdD^2L$$

where
- ACS is the average crush strength in pounds force,
- d is the compacted bulk density of the extrudates in pounds per cubic foot,
- D is the average extrudate diameter in inches,
- L is the average extrudate length in inches, and
- k is a factor with a value of at least 90; and
- an attrition loss of less than 7 percent.

2. The alumina extrudate of claim 1, wherein the extrudate has a ratio of average length to average diameter in the range of about 1 to 1 to about 8 to 1.

3. The alumina extrudate of claim 2, wherein the ratio of average length to average diameter is in the range of about 3 to 2 to about 5 to 1.

4. The alumina extrudate of claim 2, wherein the average diameter of the extrudate is about 1/16 inch.

5. The alumina extrudate of claim 2, wherein the average diameter of the extrudate is about ⅛ inch.

6. The alumina extrudate of claim 2, wherein k in the average crush strength formula is at least 100.

7. The alumina extrudate of claim 6, wherein k in the average crush strength formula is at least 120.

8. The alumina extrudate of claim 2, wherein the extrudate has a surface area when measured by the nitrogen BET method of about 80–400 m.$^2$/g.

9. The alumina extrudate of claim 8, wherein the extrudate has a surface area when measured by the nitrogen BET method of about 100–300 m.$^2$/g.

10. The alumina extrudate of claim 2, wherein the uniformity factor, U, is greater than 0.60.

11. The alumina extrudate of claim 2, wherein the uniformity factor, U is greater than 0.70.

12. The alumina extrudate of claim 2, wherein the median pore diameter of the micropore volume is from about 100 to 150 Angstrom units.

13. The alumina extrudate of claim 2, wherein the micropore volume is from about 0.65 to 0.80 cm.$^3$/g.

14. The alumina extrudate of claim 2, wherein the surface area within said micropore volume is greater than 98 percent of the total surface area measured by the nitrogen BET method.

15. The alumina extrudate of claim 2, wherein the extrudate has an attrition loss of less than 5 percent.

16. The alumina extrudate of claim 2, wherein the extrudate is made from a crystallographically pure microcrystalline alpha alumina monohydrate.

17. The alumina extrudate of claim 2, further characterized by having a volume shrinkage of less than 6 percent.

18. The alumina extrudate of claim 17, wherein the shrinkage is less than 5 percent.

19. The alumina extrudate of claim 2, further comprising at least one rare earth oxide deposited onto the extrudate.

20. The alumina extrudate of claim 19, wherein the rare earth oxide comprises at least lanthanum oxide.

21. The alumina extrudate of claim 20, wherein the rare earth oxide comprises 1–15 weight percent of the total extrudate weight.

22. The alumina extrudate of claim 21, wherein the rare earth oxide comprises 3–9 weight percent of the total extrudate weight.

23. The alumina extrudate of claim 2, wherein the intermediate pore volume is less than 0.03 cm.$^3$/g.

24. The alumina extrudate of claim 2, wherein the macropore volume is in the range of from greater than 0.15 to less than 0.25 cm.$^3$/g.

25. The alumina extrudate of claim 2, wherein the compacted bulk density is from 27 to 38 pounds per cubic foot.

26. The alumina extrudate of claim 2, wherein the total mercury pore volume is from 0.75 to 1.15 cm.$^3$/g.

27. The alumina extrudate of claim 26, wherein the total mercury pore volume is from 0.80 to 1.00 cm.$^3$/g.

28. The alumina extrudate of claim 2, wherein the macromedian pore diameter ranges from about 3,000 to 7,000 Angstrom units.

29. The alumina extrudate of claim 28, wherein the macromedian pore diameter ranges from about 4,000 to 6,000.

30. A method of producing a bimodal thermally stable, pure transition alumina extrudate suitable for use as a catalyst support having a substantial first micropore volume made of relatively small pores having a pore diameter of less than 500 Angstrom units, a second macropore volume made of relatively large pores with a pore diameter in the range of 1,000 to 10,000 Angstrom units, and with very little intermediate pore volume made of pores with a pore diameter in the range of 500 to 1,000 Angstrom units, said method comprising the steps of
  (a) forming an aqueous mixture of a microcrystalline alpha alumina monohydrate which is an intermediate between boehmite and pseudoboehmite having a solids content in the range of 32–42 weight percent;

(b) mixing the material of step (a) to form a paste for 15 to 300 minutes which renders the paste extrudable;

(c) extruding the paste of step (b) to form extrudates having a length to diameter ratio of about 1 to 1 to about 8 to 1;

(d) drying the extrudates; and (e) calcining the extrudates at a temperature in the range of 800°–2,000° F. to obtain an alumina extrudate having a first micropore volume, as measured by mercury porosimetry, having pore diameters of 500 Angstrom units or less, of about 0.60 to 0.85 cm.$^3$/g.;

a second macropore volume, as measured by mercury porosimetry having pore diameters in the range of 1,000 to 10,000 Angstrom units, of about 0.10 to less than 0.30 cm.$^3$/g.;

an intermediate pore volume, as measured by mercury porosimetry, having pore diameters in the range of 500 to 1,000 Angstrom units, of less than 0.05 cm.$^3$/g.; and a median micropore diameter, of 90–210 Angstrom units.

31. The method according to claim 30, wherein the solids content of step (a) is controlled to be in the range of 35–40 weight percent.

32. The method according to claim 30, further comprising tumbling the extrudates made in step (c) to round the ends and reduce any edge irregularities so as to render the extrudates less susceptible to attrition.

33. The method according to claim 30, wherein the length to diameter ratio in step (c) is controlled to be about 3 to 2 to about 5 to 1.

34. The method according to claim 30, wherein the calcination temperature is controlled to produce an extrudate having a surface area when measured by nitrogen porosimetry of about 80–400 m.$^2$/g.

35. The method according to claim 34, wherein the calcination temperature is controlled to produce an extrudate having a surface area of 100–300 m.$^2$/g.

36. The method according to claim 30, wherein said microcrystalline alpha alumina monohydrate powder is characterized by a d-spacing which ranges from about 6.2 to about 6.5 Angstrom units.

37. The method according to claim 30, wherein the microcrystalline alpha alumina monohydrate added to the mixture in step (a) comprises a mixture of a dry powder and a washed wet filter cake.

38. The method according to claim 30, further comprising increasing the thermal stability of the extrudates by depositing at least one rare earth oxide into the extrudates.

39. The method according to claim 38, wherein the rare earth oxide deposited comprises at least lanthanum oxide.

40. The method according to claim 30, further comprising adding to the aqueous mixture of step (a) recycled fines of previously formed extrudates which have been calcined at temperatures no higher than the calcination temperature employed in step (e).

41. The method according to claim 40, wherein the mixture in step (a) comprises recycled fines in an amount up to 15 parts by weight per 100 parts of solids.

42. The method according to claim 30, wherein the aqueous mixture is formed by initially mixing a fraction of the alpha alumina monohydrate with the total amount of water and then adding the remaining amount of alpha alumina monohydrate with additional mixing.

43. The method according to claim 42, wherein the first fraction added is about 50 percent.

44. The method according to claim 42, wherein the first fraction is about 90 to 95 percent.

45. The method according to claim 30, further comprising adding at least one additive to the mixture before the extrusion in step (c).

46. The method according to claim 45, wherein the additive is an acidic additive.

47. The method according to claim 46, wherein the acid additive is aluminum nitrate.

48. The method according to claim 45, wherein the additive comprises a base selected from the group consisting of aqueous ammonium hydroxide and anhydrous ammonia gas.

49. The method according to claim 48, wherein the base is aqueous ammonium hydroxide.

50. The method according to claim 48, wherein the neutralization material is anhydrous ammonia gas.

51. The method according to clai 30, wherein the mixing time in step (b) is from about 15 to 70 minutes.

52. The method according to claim 30, wherein the drying in step (d) is performed slowly and uniformly.

53. The method according to claim 52, wherein the drying is performed as the extrudates move continuously through a heating zone.

54. The method according to claim 30, wherein the calcining in step (e) is done in a rotary calciner.

55. The method according to claim 54, wherein the calcining in step (e) is done continuously in a rotary calciner.

* * * * *

UNITED STATES PATENT AND TRADEMARK OFFICE
CERTIFICATE OF CORRECTION

PATENT NO. : 4,301,037
DATED : Nov. 17, 1981
INVENTOR(S) : Moises G. Sanchez and Jose E. Herrera It is certified that error appears in the above-identified patent and that said Letters Patent are hereby corrected as shown below:

In Claim 34, line 3, after "by" insert --the-- and on line 4, replace "porosimetry" with --BET method--.
In Claim 51, line 1 replace "clai" with --claim--.

Signed and Sealed this

Twenty-seventh Day of April 1982

|SEAL|

Attest:

GERALD J. MOSSINGHOFF

Attesting Officer    Commissioner of Patents and Trademarks